(12) United States Patent
Paturi et al.

(10) Patent No.: US 12,380,374 B2
(45) Date of Patent: *Aug. 5, 2025

(54) COMPLEX APPLICATION ATTACK QUANTIFICATION, TESTING, DETECTION AND PREVENTION

(71) Applicant: Ivanti, Inc., South Jordan, UT (US)

(72) Inventors: Anand Paturi, Albuquerque, NM (US); Srinivas Mukkamala, Albuquerque, NM (US); Caleb Hightower, Albuquerque, NM (US)

(73) Assignee: Ivanti, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,331

(22) Filed: Apr. 16, 2024

(65) Prior Publication Data

US 2024/0281726 A1 Aug. 22, 2024

Related U.S. Application Data

(63) Continuation of application No. 16/932,513, filed on Jul. 17, 2020, now Pat. No. 11,961,021, which is a
(Continued)

(51) Int. Cl.
*G06F 15/16* (2006.01)
*G06F 16/958* (2019.01)
(Continued)

(52) U.S. Cl.
CPC .......... *G06Q 10/06* (2013.01); *G06F 16/986* (2019.01); *G06F 21/54* (2013.01); *G06N 5/022* (2013.01);
(Continued)

(58) Field of Classification Search
CPC ... H04L 67/02; H04L 67/535; H04L 63/1416; H04L 63/1433; G06F 21/54;
(Continued)

(56) References Cited

U.S. PATENT DOCUMENTS 10,387,656 B2 * 8/2019 Roichman ........... H04L 63/1433
10,579,803 B1 * 3/2020 Mueller ................ G06F 21/577
(Continued)

*Primary Examiner* — Bharat Barot

(57) ABSTRACT

An apparatus and method for cyber risk quantification calculated from the likelihood of a cyber-attack on the target enterprise and/or cyber ecosystem based on its security posture. The cyber-attack likelihood can be derived as a probability-based time-to-event (TTE) measure using survivor function analysis. The likelihood probability measure can also be passed to cyber risk frameworks to determine financial impacts of the cyber-attacks. Embodiments of the present invention also relate to an apparatus and method {1} to identify and validate application attack surfaces and protect web applications against business logic-based attacks, sensitive data leakage and privilege escalation attacks; and/or {2} that protects web applications against business logic-based attacks, sensitive data leakage and privilege escalation attacks. This can include implementing an intelligent learning loop using artificial intelligence that creates an ontology-based knowledge base from application request and response sequences. Stochastic probabilistic measures are preferably applied to a knowledge base for predicting malicious user actions in real time.

20 Claims, 20 Drawing Sheets

Related U.S. Application Data continuation of application No. PCT/US2019/014342, filed on Jan. 18, 2019.

(60) Provisional application No. 62/619,017, filed on Jan. 18, 2018, provisional application No. 62/623,395, filed on Jan. 29, 2018, provisional application No. 62/638,780, filed on Mar. 5, 2018.

(51) Int. Cl.
| | |
|---|---|
| *G06F 21/54* | (2013.01) |
| *G06N 5/022* | (2023.01) |
| *G06N 5/04* | (2023.01) |
| *G06Q 10/06* | (2023.01) |
| *G06Q 30/018* | (2023.01) |
| *H04L 9/40* | (2022.01) |
| *H04L 67/02* | (2022.01) |
| *H04L 67/1095* | (2022.01) |
| *H04L 67/50* | (2022.01) |
| *G06F 16/901* | (2019.01) |
| *G06F 18/214* | (2023.01) |
| *G06F 21/57* | (2013.01) |
| *G06N 7/01* | (2023.01) |
| *G06N 20/00* | (2019.01) |
| *G06Q 10/10* | (2023.01) |

(52) U.S. Cl.
CPC ............. *G06N 5/04* (2013.01); *G06Q 30/018* (2013.01); *H04L 63/1416* (2013.01); *H04L 63/1433* (2013.01); *H04L 67/02* (2013.01); *H04L 67/1095* (2013.01); *H04L 67/535* (2022.05); *G06F 16/9024* (2019.01); *G06F 18/214* (2023.01); *G06F 21/577* (2013.01); *G06F 2221/033* (2013.01); *G06F 2221/2101* (2013.01); *G06N 7/01* (2023.01); *G06N 20/00* (2019.01); *G06Q 10/10* (2013.01)

(58) Field of Classification Search
CPC . G06F 2221/033; G06F 16/986; G06N 20/00; G06N 5/04; G06Q 10/06
USPC .............. 709/202–203, 223–224; 726/22–24
See application file for complete search history.

(56) References Cited

U.S. PATENT DOCUMENTS

| | | | |
|---|---|---|---|
| 11,961,021 B2* | 4/2024 | Paturi | ................ H04L 63/1416 |
| 2021/0112052 A1* | 4/2021 | Lores | ................... H04L 63/126 |

\* cited by examiner

COMPLEX APPLICATION ATTACK QUANTIFICATION, TESTING, DETECTION AND PREVENTION

CROSS-REFERENCE TO RELATED APPLICATIONS

This application is a continuation application of U.S. patent application Ser. No. 16/932,513, filed Jul. 17, 2020 and issued as U.S. Pat. No. 11,961,021 on Apr. 16, 2024, which is a continuation of PCT/US2019/014342, filed Jan. 7 8, 2019, which itself claims priority to and the benefit of the filing of U.S. Provisional Patent Application No. 62/619,017, entitled "A Method for Testing Complex Application Attacks Using Offensive Ontology", filed 011 Jan. 18, 2018: as well as U.S. Provisional Patent Application No. 62/623,395, entitled "An Intelligent System for Detecting and Preventing Complex Application Attacks in Real Time" filed on Jan. 29, 2018; as well as U.S. Provisional Patent Application No. 62/638,780, entitled "Cyber-Risk Quantification From Attack Likelihood of Vulnerabilities" filed on Mar. 5, 2018; and the specifications and claims thereof are incorporated herein by reference.

BACKGROUND OF THE INVENTION

Field of the Invention (Technical Field)

Embodiments of the present invention relate to cyber-risk quantification, testing, detection and prevention for computer software—particularly web applications. More particularly, embodiments of the present invention relate to the evaluation of new software to quantify the likelihood of an attack thereon as well as its vulnerabilities; testing software using offensive techniques; and/or detecting and preventing complex attacks in real time for software. Further, embodiments of the present invention relate to the field of computers, computer networks, web applications, databases, cloud computing, Internet of Things (IoTs) and cyber security. Specifically, embodiments of the present invention relate to quantifying the likelihood of exploiting vulnerabilities (using probability measures) within a target organization. The exploit likelihood for a given vulnerability is preferably derived using a survival analysis technique, which can also be combined with financial impact frameworks to quantify the cyber risk for target organizations.

Embodiments of the present invention also relate to software security where target software and web applications can be tested and validated for sophisticated attacks like business logic-based attacks, session hijacking, privilege escalation etc. This inline solution also preferably allows for identification and comprehensive validation of the attack surface of software, applications, and software layers using an intelligent interceptor, knowledge base and offensive ontology-based payloads. Embodiments of the present invention also relate to software security where target software and web applications are protected against sophisticated attacks like business logic-based attacks, session hijacking, privilege escalation etc. through real time detection of user behavior anomalies by an intelligent self-learning feedback loop.

In summary, embodiments of the present invention relate to an apparatus and method for cyber risk quantification calculated from the likelihood of a cyber-attack on the target enterprise and/or cyber ecosystem based on its security posture. The cyber-attack likelihood can be derived as a probability-based time-to-event (TTE) measure using survivor function analysis. The vulnerability data along with internal security control data (like configuration management, endpoint protection, parameter security devices, patch management, event logs etc.) can be correlated with threat, security incident and custom TTE data from a master TTE Index and subjected to regression analysis for deriving the cyber-attack likelihood. The likelihood probability measure can also be passed to cyber risk frameworks to determine financial impacts of the cyber-attacks. Embodiments of the present invention also relate to an apparatus and method to identify and validate application attack surfaces and protect web applications against business logic-based attacks, sensitive data leakage and privilege escalation attacks. In one embodiment, the present invention implements an intelligent learning loop using artificial intelligence that creates an ontology-based knowledge base from application request and response sequences. In one embodiment, the knowledge base represents the user behavioral model and is preferably further used to create offensive ontology applying predicate logic negation rules process. The offensive ontology preferably generates payloads to test target web applications against attacks that target flaws in the underlying application logic. Embodiments of the present invention also relate to an apparatus and method that protects web applications against business logic-based attacks, sensitive data leakage and privilege escalation attacks. The innovative mechanism preferably implements an intelligent learning loop using artificial intelligence that creates an ontology-based knowledge base from application request and response sequences. Stochastic probabilistic measures are preferably applied to a knowledge base for predicting malicious user actions in real time. More specifically, in one embodiment, the knowledge base is used to create a Markov Logic Network and dynamic inference is applied (using time slice networks and relative entropy measures) on it to detect anomalies in user behavior—thus predicting complex application attacks like privilege escalation attempts, sensitive data leakage etc. in real time.

DESCRIPTION OF RELATED ART

The recent mega data breaches of well-known companies and widespread attacks (including WannaCry, (Not)Petya and Bad Rabbit ransomware) demonstrated that organizations are failing to protect critical assets from cyber-attacks and falling prey to heavy financial losses. Such attacks are the result of poor operational security procedures (or a lack of them) in target organizations because the vulnerabilities responsible were disclosed (along with patches) months before the attacks happened and organizations failed to fix them in a timely manner.

To avoid such circumstances, organizations must successfully conduct a vulnerability and threat centric risk assessment and adapt an efficient risk management strategy. Risk assessment includes enumerating an organization's assets, associated vulnerabilities and potential risks posed from threats applicable to those vulnerabilities. Risk management includes estimating financial and business exposure from risks posed, implementing approaches for risk-reduction, and prioritizing such risk reduction approaches.

During a risk assessment, organizations must identify their attack surface (as comprehensively as possible) and the risks posed to that attack surface. Identifying the attack surface includes enumerating all critical assets to the business, ranking them by business criticality, understanding the service stacks they are running and their contribution to the day-to-day business, and finally identifying vulnerabilities that affect them.

Risk assessment on the attack surface includes ranking the vulnerabilities based on the risk they pose to the organization i.e., risk-based prioritization of the vulnerabilities.

Challenges for Risk Assessment

Organizations face two primary challenges during the risk assessment phase:
  (a) Rapidly changing attack surface; and
  (b) Limited risk-based vulnerability prioritization.

Rapidly Changing Attack Surface

Organizations encounter a rapidly changing attack surface due to the following:
  1. Dynamic IT footprint: After organizations started allowing ubiquitous internet communication devices to access critical business information, the organizational IT infrastructure map has become fluid because they sporadically (dis)appear from organization's IT footprint.
  2. Cloud computing: Subscriptions to SaaS-based offerings have made an organization's IT footprint more diverse as their critical data (and related infrastructure) now lies in an extended environment on which they have limited control.

Both the above factors result in partial business exposure enumeration due to the following:
  1. The dynamic IT footprint makes it difficult for organizations to keep track of their IT footprint, subsequently resulting in enumerating a partial attack surface during the risk assessment. Hence, the business exposure analysis is performed on a partial input.
  2. The cloud computing, software as a service ("SaaS")-based subscriptions, and third-party integrations increase the scope of business exposure that is unknown to organizations. In other words, organizations' business exposure now depends on the security of the third parties that are integrated, making it more unpredictable.

Lack of Risk-Based Vulnerability Prioritization

Risk-based vulnerability prioritization includes prioritizing vulnerabilities based on their criticality and their likelihood of exploitation. Combining the prioritized vulnerabilities with financial impact frameworks produces an accurate risk representation for the target organization. Hence, it is extremely important to determine the likelihood of exploiting a vulnerability in the target organizational infrastructure. This includes the following steps:
  1. Identifying threats applicable to vulnerabilities existing in the attack surface.
  2. Predicting high-risk vulnerabilities among the existing ones based on their exploitability and the organization's susceptibility to them.
  3. Evaluating post attack impact of the vulnerabilities upon their successful compromise.

One important aspect for efficiently executing the above steps is adversary modeling against the vulnerabilities under consideration. The adversary modeling produces the set of techniques and tactics adversaries will perform during pre- and post-attack scenarios using the vulnerabilities. Implementing an automated approach for adversary modeling for all attack scenarios is a challenge. Hence, subject matter expertise (SME) support is adapted wherever required.

Risk-based vulnerability prioritization should not be restricted to the core organizational infrastructure, it instead should be extended to any cloud infrastructure components the organization uses or subscribes to. Further, all third-party vendors doing business with the organization should be included in such risk-based vulnerability prioritization or at least their cyber risk should be quantifiable from publicly available infrastructure related data. Achieving the above poses a severe challenge to organizations because it's infeasible for them to create, maintain and enhance a master index of vulnerabilities (and their likelihood of exploit) of myriad software, hardware and firmware products that are part of their infrastructure and extended infrastructure (third party vendors and cloud subscriptions).

There is a present need for a novel methodology and system to determine the likelihood of exploiting a vulnerability that can be used to further quantify the cyber-risk for target organizations. Embodiments of the present invention solve this need and provide a likelihood that is represented in terms of a probability measure that significantly reduces the uncertainty involved in determining the susceptibility of the target organization to underlying vulnerabilities.

There is thus a present need for a system, method and apparatus for cyber risk quantification that is preferably calculated from the likelihood of a cyber-attack on the target enterprise and cyber ecosystem based on its security posture.

Software and web applications are one of the primary sources of infiltration in majority of the successful cyber-attacks. This is primarily due to factors such as a lack of secure coding practices while developing software and web applications, and the failure of automated software and web application security mechanisms to detect and prevent attacks in a timely manner owing to ever changing software and web application technologies and complexity involved in discovering underlying software and web application attacks.

Currently available software and web application security mechanisms implement one or more of the following techniques to detect vulnerabilities and prevent attacks caused by them:

Avoid vulnerabilities—This includes educating programmers regarding secure programming techniques such that introduction of vulnerabilities (through poor programming techniques) can be avoided during the development phase of web applications.

Detect vulnerabilities—This is the most prevalent approach in today's web application security realm. These solutions consist of automated web application scanners (black box testing or Dynamic Application Security Testing ("DAST")), source code analysis (white box testing or static application security testing ("SAST") and a combination of automated scanning and manual testing (grey box testing).

Prevent attacks—This approach includes using technologies like web application firewalls ("WAFs") which are configured to detect and prevent malicious hypertext transfer protocol "HTTP(S)" requests targeted towards web applications.

Detect and Prevent Attacks—This category of solutions is termed as Runtime Application Self-Protection ("RASP") where sensors are placed within the code engine to detect and prevent injection-based attacks from within the application.

At their core, automated portions of all above solutions rely on analyzing application behavior when potentially malicious expressions (code snippets) are assigned to different application parameters and executed. This technique allows them to discover and potentially prevent only script-based and injection vulnerabilities like cross-site scripting ("XSS") and structured query language ("SQL") injection and their variants.

Due to their dependency on syntactic code analysis for identifying vulnerabilities, existing solutions cannot detect and avoid non-injection, scripting-based vulnerabilities. Primarily vulnerabilities that cause business logic-based vulnerabilities, privilege escalation, insecure direct object reference ("IDOR"); do not involve any malicious scripts but take advantage of flaws in the application's business logic implementation. The following are two examples of such attacks:

1) An online shopping portal might provide its users with coupons for discount during check out. Each coupon is typically valid only for one-time use. If the logic that restricts one-time usage of the coupon is not correctly implemented within the application, then it could be exploited by adversaries during the checkout process where they could apply one coupon multiple times, reduce the overall cart total below an acceptable amount and successfully exploit the flaw in the implementation.

2) An application supporting multiple user levels should always restrict users belonging to low level access from accessing resources or data privileged for only high-level access users. If the access policies are not safely implemented in the application, then it could be exploited by low level users to access restricted sensitive information and cause privilege escalation attack and sensitive data leakage. Such attacks that target business logic implementation flaws are generally referred to as complex application attacks.

None of the existing automated application security solutions successfully detect or prevent above-mentioned attacks, because this requires the solution to have prior knowledge of the target application's behavior. Additionally, all requests sent by the end user during such attacks seem like legitimate requests to WAFs and RASP solutions, because they do not include any malicious scripts but only valid data syntax is assigned to different application parameters.

In the current application security realm, complex application attacks are discovered only through manual security testing (penetration testing). This is primarily due to the capability of security analysts to gather domain knowledge of the target application, analyze its behavior and further exploit any behavioral or logical flaws within.

This approach is rapidly becoming impractical due to the following reasons. First, it is difficult for humans to scale while efficiently testing an ever-increasing number of applications with complex business logic implementation, given the time it takes to manually evaluate each application. Second, manual security analysis is not a onetime testing process but should be incorporated into application development process where it can be invoked every time an application's logic is changed or new logic is introduced. As can be seen, there is a present need for automation of manual security analysis processes to discover complex application vulnerabilities.

There is thus a present need for a system, method and apparatus capable of identifying and validating application attack surface and protecting web applications against business logic-based attacks, sensitive data leakage and privilege escalation attacks—particularly one which can implement an intelligent learning loop using artificial intelligence to create an ontology-based knowledge base from application request and response sequences.

BRIEF SUMMARY OF EMBODIMENTS OF THE PRESENT INVENTION

An embodiment of the present invention relates to a method for quantifying the likelihood of cyber-attack on target assets including creating a master time-to-event ("TTE") index, the master TTE index including a plurality of security entities that are each associated with a TTE value; mapping the security entities and security events to form an organizational TTE index having TTE values; synchronizing the organizational TTE index with the master TTE index for at least some of the security entities; calculating an attack likelihood by applying a survivor function or a cox regression analysis to the organizational TTE index; and quantifying risk by inputting the attack likelihood into a cyber risk quantification framework.

In one embodiment the security events can be inferred from an organization's security controls. The method can also include synchronizing the organizational TTE index with the Master TTE index for the security entities can include using a feedback loop whereby TTEs assigned to each security entity in the Master TTE are imported into the organizational TTE index. The feedback loop can update the TTEs of the security entities in the master TTE index based on events observed within the organizational security controls. The organizational TTE index can communicate with the organizational security control to apply contextual attributes to the security entities.

In the method, calculating an attack likelihood can include calculating a likelihood of exploit for vulnerabilities. Calculating an attack likelihood can include using a result of the likelihood of exploit for vulnerabilities calculation in combination with input from an exploit likelihood determination to determine risk quantification for a target organization. Optionally, the cyber risk quantification framework can include factor analysis of information risk. The master TTE can implement a coherent mapping index between security entities and their TTE values. Optionally, security entity data and/or information can be gathered from one or more of the public internets, the dark web and a threat intelligence team.

In one embodiment, the security incident can be mapped to security entities and a TTE can be derived in terms of Time-to-Compromise. Mappings between the security incident and security entities can be stored as a knowledge map for further predictive analysis. The organizational TTE index can represent the security entities and corresponding organizational TTEs that are pertinent to the organization such that survivor function techniques can be applied to it. In one embodiment, the organizational TTE index gathers security findings from active and passive security analysis. The security findings from active and passive security analysis can be mapped to the master TTE index and the corresponding organizational TTE index can be synchronized in real time. A feedback loop can be provided that passes security events and processed logs from organizational security infrastructure to the master TTE index.

Optionally, the master TTE index updates its TTE values based on observations gathered from the security events and/or the master TTE index can push updated TTE values to the organizational TTE index. In one embodiment, an attack likelihood comprises calculating a likelihood of attack for a target organization, which itself can optionally include calculating the likelihood of attack for each asset within an organizational infrastructure.

In one embodiment of the method, calculating an attack likelihood can include determining a likelihood of attack for each target asset based on a weighted aggregate of likelihood of exploit of all vulnerabilities within each target asset. Calculating an attack likelihood can optionally include determining a likelihood of exploit for each of a plurality of vulnerabilities by applying survivor function analysis on the organizational TTE index after the organizational TTE index has been synchronized with the master index.

In one embodiment, the method can also include displaying the survivor function as a forecast of exploit likelihood over a predetermined time period, which predetermined time period can be derived automatically or accepted as manual input. In one embodiment, wherein the predetermined time period is derived automatically, it can be based at least partially on an organizational patch cycle. Optionally, quantifying risk can include calculating organizational risk based on an organization's existing vulnerabilities and/or can include combining an attack likelihood with financial frameworks to derive financial impacts for a target organization.

An embodiment of the present invention also relates to a method for providing intelligent web application security including creating a comprehensive application attack surface by providing a feedback learning loop configured to implement an intelligent interceptor module and a data capture module, the feedback learning loop enhancing an application knowledge base in real time: configuring the intelligent interceptor module to capture synchronous and asynchronous HTTP requests and response sequences of a target application resulting from user actions in real time and passing them to a data processing module; the data processing module creating structured content hierarchy from captured unstructured HTTP(S) data and passing it to a knowledge module; the knowledge module creating a concept hierarchy from the structured content hierarchy, the knowledge module further generating target application ontology from the concept hierarchy and storing it in a knowledge base; and an intelligent scanner creating offensive ontology-based payloads while testing the target web application for complex web application attacks. In one embodiment of the method, the target application ontology can represent an end user behavioral model. The knowledge module can optionally store the target application ontology in the knowledge base as a graph. Optionally, the knowledge base can create offensive ontology using the target application ontology. In one embodiment, the offensive ontology-based payloads represent an adversary behavioral model. The knowledge base can be a machine understandable knowledge base and the knowledge base can optionally create offensive ontology using the target application ontology. The offensive ontology can represent an adversary behavioral model.

In one embodiment, the method can include configuring a command and control center to allow end users to communicate with the feedback learning loop and the intelligent scanner. The intelligent interceptor preferably implements a memory-aware browser-based sensor to capture all events resulting from asynchronous communication created from user actions on the target application in real time. The memory-aware sensor preferably creates a stack trace of events from asynchronous communications, so as to capture the document object module state changes, related event chains and corresponding parameter values resulting from user actions. The memory-aware sensor can optionally store the stack trace in a repeatable audit log format using a graph-based data structure. The intelligent interceptor optionally implements a synchronization module that creates a transaction unit, which transaction unit can linearly interleave all events resulting from user actions captured from synchronous and asynchronous communication.

In one embodiment of the method, a set of union of all transaction units can be represented as a content hierarchy of the target application. The knowledge module can represent the target application ontology as predicate logic statements. The target application ontology resulting from user actions can be stored in a graph-based knowledge base that acts as a behavioral model of the target application. Optionally, the behavioral model of the target application can be categorized by an end user privilege access level. The knowledge module can create an adversarial behavior model by creating offensive ontology from the application behavioral model stored in the knowledge base.

Optionally, the intelligent scanner, as part of a scan initiation, can accept subject-matter expert input to create offensive ontology payloads. The method can also include one or more subject-matter experts specifying rules that represent complex attacks for the target application. The offensive ontology payloads can optionally be derived from the rules specified by the one or more subject-matter experts. The subject-matter expert rules can be translated to a predicate-based ontology representation. The ontology from the subject-matter expert rules can be validated against the target application ontology for completeness. Optionally, validated ontology can be converted to an HTTP request and response sequences that can be executed against the target application. The resulting offensive ontology payloads can be feedback to the knowledge base.

In one embodiment, as part of a scan evaluation, the intelligent scanner preferably evaluates target application behavior against offensive ontology-based HTTP requests. The intelligent scanner can enhance parameters of offensive ontology-based HTTP(S) requests upon partial identification of intended behavior. Upon successful execution of an offensive ontology payload-based HTTP(S) request, the corresponding payload ontology can be updated into the knowledge base. An impact of severity of the offensive ontology-based payload can optionally be presented.

The method can also optionally include a command and control center that allows end users to enable and/or disable the intelligent scanner and a learning mode. Optionally, the end user can enable the learning mode and activate the feedback learning loop and/or enable an intelligent scanning mode and test the target application for complex application attacks.

An embodiment of the present invention also relates to a method for testing and protecting organizational software web applications against complex web application attacks including an event capture module communicating with a knowledge base to create comprehensive predicate logic representation for events generated by one or more end users in real time; the event capture module communicating with a deduction module to allow passing user and application logic identifiers as constants to a process for creating a grounded Markov Logic Network ("MLN"); a deduction module aiding in the creation of the grounded MLN via its communication with the knowledge base and the event capture module; passing the grounded MLN to an MLN management module; the MLN management module receiving input from the deduction model; and an alert module receiving inputs from the MLN management module.

In one embodiment, the MLN management module can perform static and dynamic inference to predict and prevent complex web application attacks. The MLN management module preferably forms a feedback loop to the event capture module to reevaluate a primitive event to enhance learning. The alert module can optionally be activated based on attack detection and/or prevention triggers from the MLN management module. The deduction module optionally includes an inductive logic programming-based inference engine that creates grounded MLN for target web applications from user actions. The inference engine preferably assigns weights to the predicate statements that represent user actions on the target web application. The analysis engine can optionally calculate weights as a maximum likelihood estimator for a probability function. The probability function can be based on all state transitions for underlying events applicable to each of a privilege access level. In one embodiment, the inference engine accepts weight inputs that originate from subject matter experts. The inference engine can optionally create a grounded MLN (optionally in live and/or learning mode) for target web applications from end user actions.

In one embodiment, the methods of embodiments of the present invention can optionally be implemented via computer software, stored on non-transitory computer-readable medium and each step of each method can be accomplished via code operating on one or more computers.

In one embodiment, the inference engine can receive unique user identifiers from the KB and event capture module; the unique user identifiers can include one or more elements selected from a list consisting of session variables, user id, nonce, privilege access level and a combination thereof; and/or the inference engine can use the application logic identifiers and user-specific identifiers as constants in the grounded MLN. The grounded MLN can optionally be created as a time slice network capturing all user actions on web applications on a temporal scale. The created grounded MLN can be a master MLN for a learning mode and the created grounded MLN can be a dynamic MLN in a live mode.

In one embodiment, the method can also include computing summary factors as a transition joint probability function between each of a plurality of temporal level in the temporal scale, and the joint probability function within a summary factor at a temporal level can optionally represent a consolidated function including all end user attributes and events executed until an immediately prior temporal level. The method can also include an inference engine performing static and dynamic inference, and the inference engine can optionally perform static analysis by accepting security analyst queries and determining if a target application is susceptible to complex application attacks. The inference engine can optionally determine if a target application is susceptible to privilege escalation attacks and business-logic attacks. The method can also optionally include end user queries to respective predicate logic statements and subjecting them to inference in the grounded MLN by using offensive ontology constructs.

In the method, the ML.N management module can optionally accept business logic rules as inputs and further predicts and prevents attacks targeting such rules. Predicting and preventing attacks targeting such rules can optionally happen in real time or near-real time. The dynamic inference for detecting insecure direct object reference and horizontal privilege access escalation attacks are optionally performed by comparing summary factors between a current and a preceding temporal level In one embodiment, comparing summary factors between a current and a preceding temporal level happens in real time or near-real time. The inference engine can optionally perform dynamic inference to detect vertical privilege escalation and other anomalous user behavior by comparing summary factors between a master MLN and a dynamic MLN. Comparing summary factors between a master MLN and a dynamic MLN can be performed by computing a relative entropy between joint probability distribution functions of the summary factors. An anomalous user behavior alert can be generated based on an entropy value generated from summary factor comparison. The anomalous user behavior alert can be generated in real time or near-real time. The method can also optionally include a command and control center that allows users to activate an attack prevention mode to enable detection of anomalous application user behavior.

An embodiment of the present invention also relates to a non-transitory computer-readable medium comprising computer software for quantifying the likelihood of cyber-attack on target assets including code for creating a master time-to-event ("TTE") index, the master TTE index comprising a plurality of security entities that are each, associated with a TTE value; code for mapping the security entities and security events to form an organizational TTE index comprising TTE values; code for synchronizing the organizational TTE index with the master TTE index for at least some of the security entities; code for calculating an attack likelihood by applying a survivor function or a cox regression analysis to the organizational TTE index; and code for quantifying risk by inputting the attack likelihood into a cyber risk quantification framework.

An embodiment of the present invention also relates a to non-transitory computer-readable medium comprising computer software for providing intelligent web application security including code creating a comprehensive application attack surface by providing a feedback learning loop configured to implement an intelligent interceptor module and a data capture module, the feedback learning loop enhancing an application knowledge base in real time: code configuring the intelligent interceptor module to capture synchronous and asynchronous HTTP requests and response sequences of a target application resulting from user actions in real time and passing them to a data processing module; code the data processing module creating structured content hierarchy from captured unstructured HTTP(S) data and passing it to a knowledge module; code the knowledge module creating a concept hierarchy from the structured content hierarchy, the knowledge module further generating target application ontology from the concept hierarchy and storing it in a knowledge base; and code an intelligent scanner creating offensive ontology-based payloads while testing the target web application for complex web application attacks.

An embodiment of the present invention also relates to a non-transitory computer-readable medium comprising computer software for testing and protecting organizational web applications against complex web application attacks including code creating an event capture module that communicates with a knowledge base to create comprehensive predicate logic representation for events generated by one or more end users in real time; code permitting the event capture module to communicate with a deduction module to allow passing user and application logic identifiers as constants to a process for creating a grounded Markov Logic Network ("MLN"); code creating a deduction module that aids in the creation of the grounded MLN via its communication with the knowledge base and the event capture module; code passing the grounded MLN to an MLN management module and which causes the MLN management module to receive input from the deduction model; and code causing an alert module to receive inputs from the MLN management module.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Cyber Risk Quantification.

Following are the definitions of terms as used throughout this application. Each term can be a security entity. More than one term collectively can be referred to as 'security entities'.

1) Vulnerability: Weakness in the target system (hardware, software, and/or firmware) that is or can be targeted by adversaries to gain illegitimate access, including but not limited to common vulnerability enumeration ("CVE").
2) Threat: A negative event that can lead to an undesired outcome on a target system like loss of data, unavailability of services etc. Threats use or become severe due to vulnerabilities in the target system, including but not limited to a threat is an exploit applicable to a CVE.
3) Weaponization: The action of applying an exploit and/or or threat to a vulnerability.
4) Patch: A remedy applied on the target system to remediate an underlying vulnerability.
5) Risk: The likelihood of something negative happening combined with how severe the impact would be if that happens. The likelihood is the probability measure and the impact is a financial measure. In one embodiment, risk can, as a non-limiting example, be given by the formula of: risk=likelihood×impact.

Figure 1:
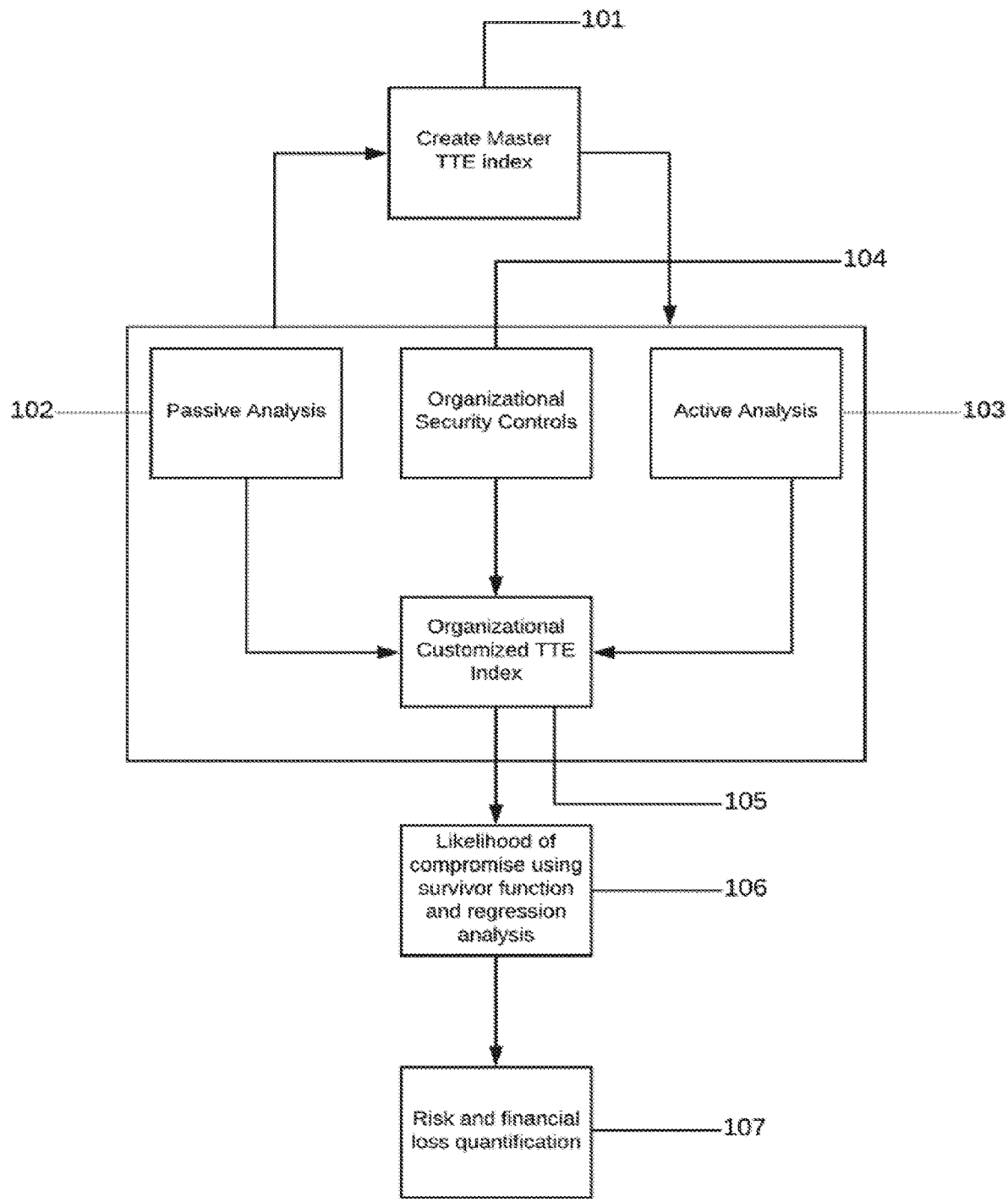
FIG. 1 is a drawing illustrating an overall process flow diagram for an embodiment of the present invention.

Referring now to the drawings, an embodiment of the present invention uses survival analysis techniques to determine the likelihood (in terms of definitive probability) of successful attack on target assets. The time-to-event (TTE) of interest in this context is the time to a successful attack (also referred as compromise) on the target asset based on its security posture. The high-level process flow for determining the likelihood of an attack is illustrated in FIG. 1.

In one embodiment, the process starts with creating Master TTE index 101 of the security entities defined above. The service provider responsible for quantifying the security risk for its clients (organizations} creates and manages such Master TTE index. The process starts with creation of the Master TTE index for the security entities as gathered and processed from the Internet, dark web and the internal threat intelligence team. As elaborated in FIG. 4, the Master TTE index is a mapping of known vulnerabilities, threats, indicators of compromise ("IoCs"), and the like, combined with publicly available security incident databases. Each entity in the Master TTE index is accompanied with a TTE value (most preferably a time constant) wherever applicable.

The Master TTE index is preferably combined with (a) security posture results from passive security analysis 102, active security analysis 103 and (b) data from organizational security controls 104 to derive an organizational specific TTE index 105. The organizational TTE index is a mapping between security entities existing in the organization's asset infrastructure, and security events inferred from the organization's security controls. An asset infrastructure can include but is not limited to for example, desktops, laptops, servers, mobile devices, web applications, desktop applications, cloud subscription assets, and Internet of things ("IOT"), combinations thereof and the like. Finally, the likelihood of compromise 106 (for each asset) is preferably derived by applying Survivor function technique and/or Cox regression analysis on the organizational TTE index 105. The derived likelihood of compromise can be used to quantify the organizational risk and financial impact of that compromise 107.

General Operating Environment

Figure 2:
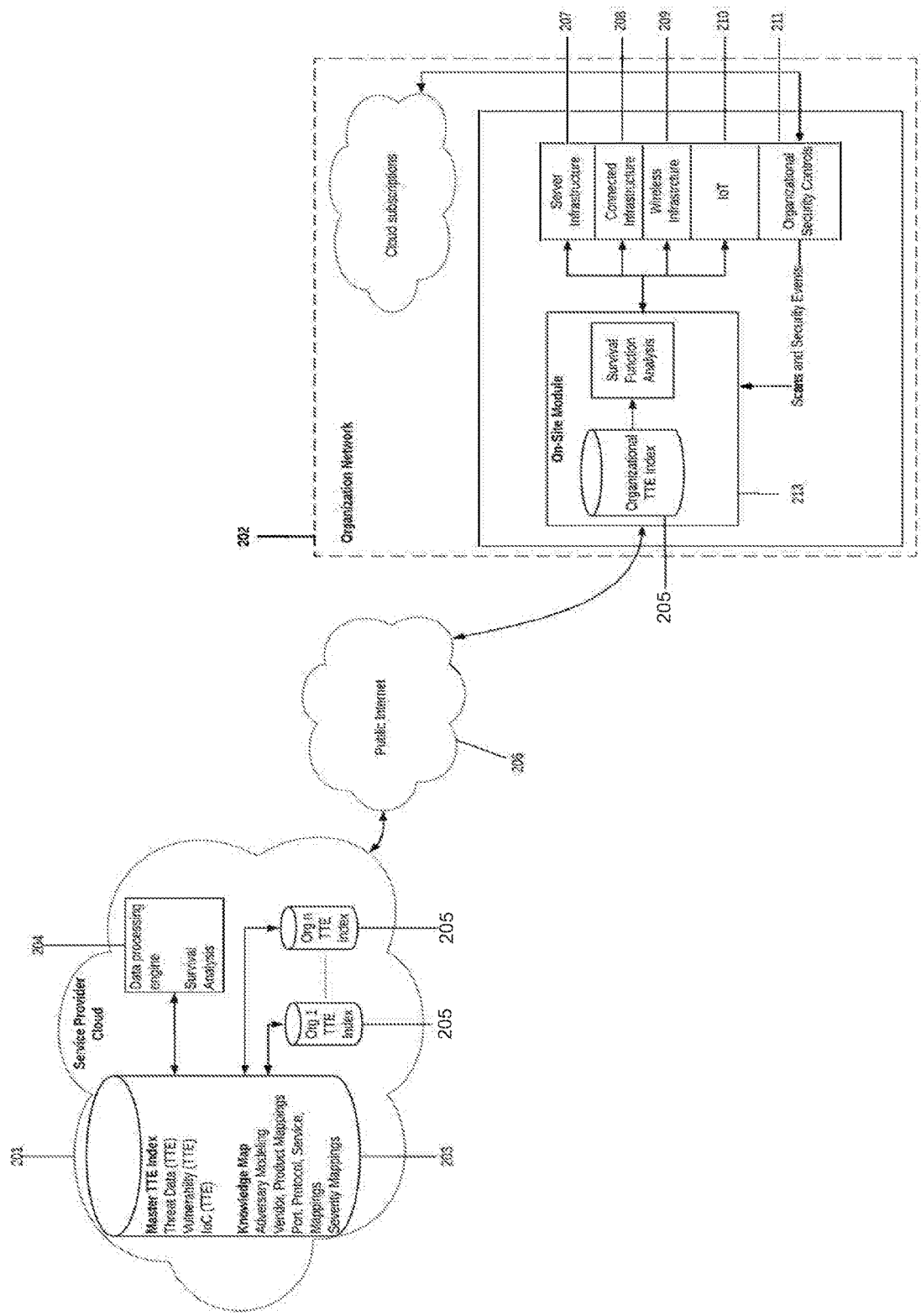
FIG. 2 is a drawing which illustrates a general operating network according to an embodiment of the present invention.
Figure 3:
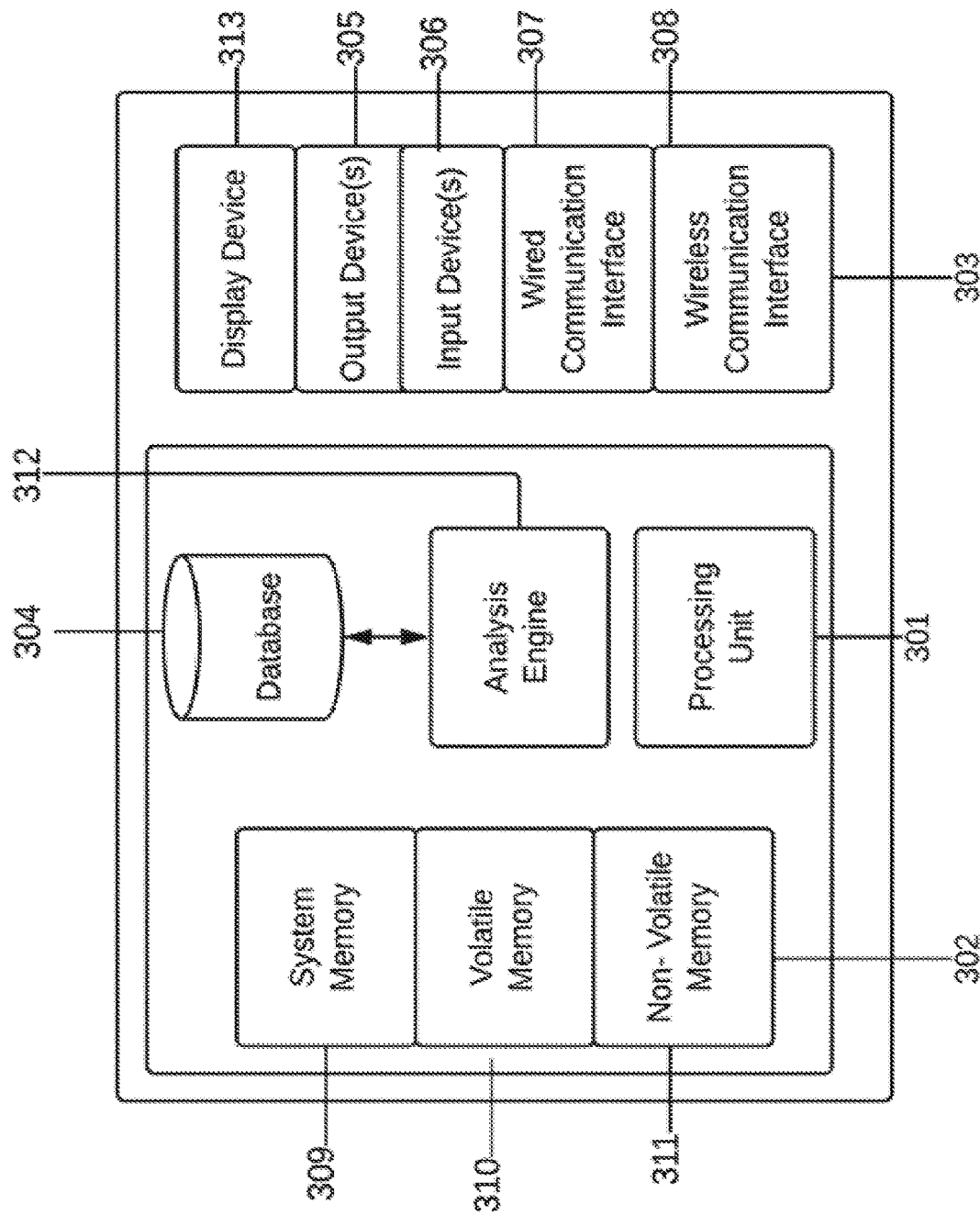
FIG. 3 is a drawing which illustrates a hardware configuration of an embodiment of the present invention.

FIG. 2 shows an embodiment of a general operating environment. Two primary components can include the service provider Cloud (SPC) 201 and the organization network 202. Though it is not explicitly shown in the illustration, embodiments of the present invention can support multiple such organization networks. The SPC preferably contains a Master TTE Index 203, a data processing engine, that preferably computes the survivor function 204, and multiple organizational TTE indices 205. Based on the architecture type chosen, the organization TTE index can optionally reside within the organizational network infrastructure as well. The communication between the SPC and the organization network is performed through a secure channel over the public Internet 206. The target organization network is composed of server infrastructure 207, connected infrastructure (like desktops, printers, scanners etc.) 208, Wireless devices (like mobile devices, laptops etc.) 209, Internet of Things (IoT) 210 and security infrastructure 211. Optionally, the organization can subscribe to third party cloud services 212 that will be considered as part of its network infrastructure. Based on the architecture chosen, the security event data and security scan data can be transferred to the SPC either directly through the secure communication or through on-site module 213. The on-site module can further be used to calculate the organization TTE index.

Hardware

In a basic configuration, the apparatuses within SPC or the on-site module can include at least one processing unit 301 and memory, such as system memory 309, volatile memory 310 and non-volatile memory 311. Additionally, the apparatus can have features to connect external media, such as output devices 305 or display devices 313; accept connections from network devices using wired communication interface 307 or wireless communication interface 308. The device can also have multiple data storage components, like database 304, that follow a relational representation structure or NoSQL (schema less) style or a quasi-architecture.

Creating the Master TTE Index

Figure 4:
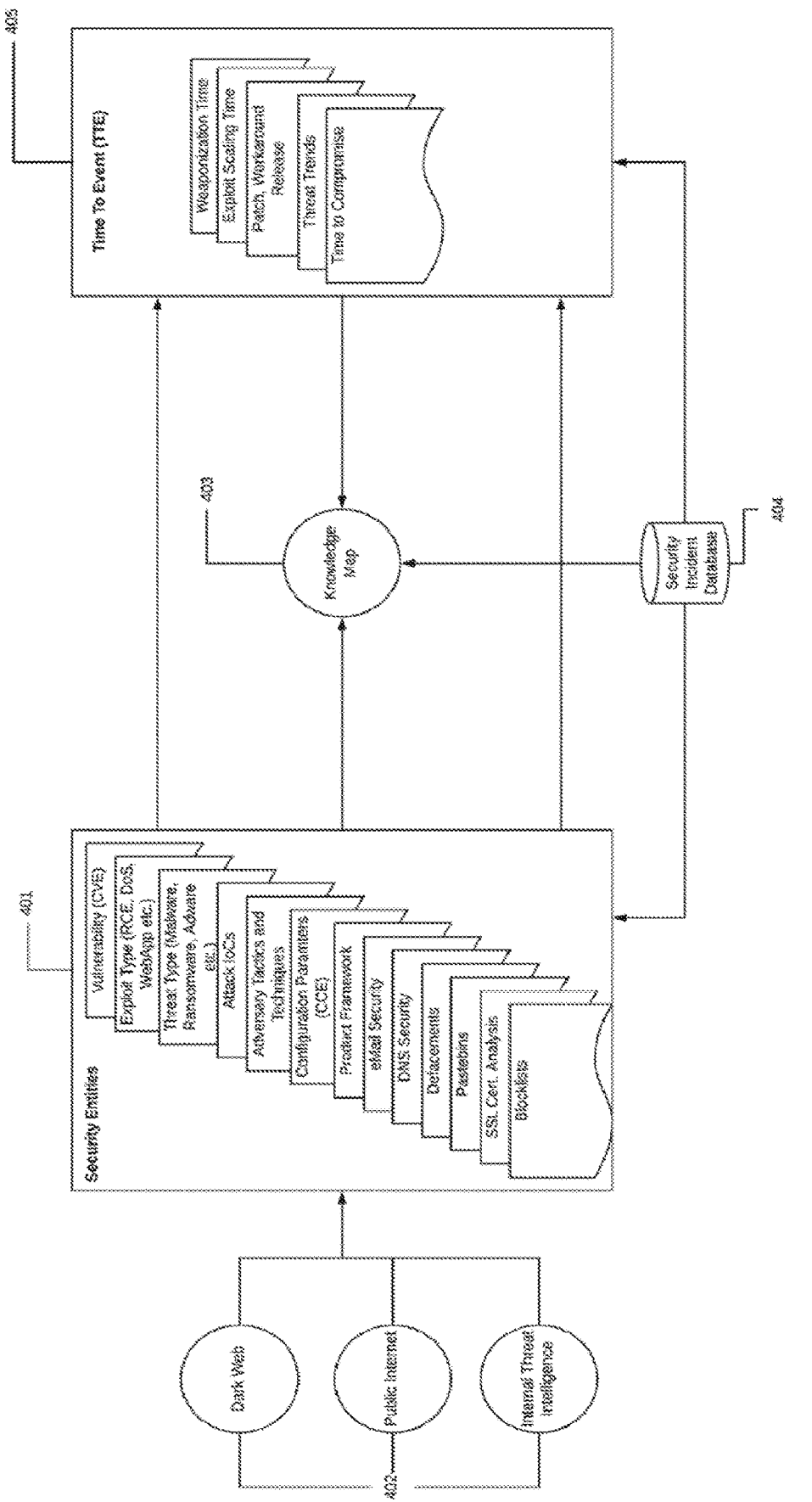
FIG. 4 is a block diagram illustrating a master time-to-event index according to an embodiment of the present invention.

FIG. 4 illustrates the implementation of the Master TTE index. As mentioned above, the Master TTE index can be a repository of security entities 401 gathered and processed from the Internet, dark web and internal threat intelligence team 402. 401 illustrates the comprehensive list of security entities gathered and processed. The Master TTE index preferably holds the following properties for each security entity:

1. A custom TTE value in terms of temporal dimension (a time constant) is preferably assigned to each entity.
2. A knowledge map 403 holding the relationship between the different security entities as inferred from the security incident database 404. The TTE time constant 405 for each security entity is preferably custom derived. Optionally, a security entity can have more than one TTE. The criteria for deriving the TTE time constant for a given security entity depends on that entity's role in an attack life cycle. As non-limiting examples, consider:
   (a) The TTE for a vulnerability (CVE in this example) is the weaponization time for that CVE and the time to compromise an asset using that CVE. The weaponization time plays a key role for a vulnerability because the vulnerability (or the asset containing the vulnerability) is susceptible to an attack right from the time instance it's weaponized with an exploit.
   (b) The TTE for a threat of type malware is the weaponization scale time i.e., the time it has taken to convert an exploit to its scaled version like a ransomware or any other malware type. In this case, if an exploit has been converted to a ransomware within t time units of its inception, then the TTE (weaponization scaling time) is t.

The key TTE captured in the Master TTE index is the time to compromise associated with different security entities. This data is gathered from publicly available security incident databases 404 including VERIS Community Database, hackmageddon etc. as well as internal threat intelligence analysis and mapped to appropriate security attributes in the Master TTE. For example, the time instance of the wannacry ransomware security incident on an asset (or organization) is mapped to its associated CVEs and exploits as their TTE (in terms of time to compromise).

Any entities in the Master TTE index that do not have a TTE are preferably considered as censored entities in the framework. This property is preferably accounted for during the survival function calculation by using a hazard function estimator.

Mapping all Entities Using a Knowledge Map:

Every security incident gathered is preferably deciphered to gather the related IoCs (including CVEs, CWEs, any hashes, exploit types, IP addresses, domain names etc.) and other attributes that are mapped to the security entities in the Master TTE index. This relationship between the IoCs and attributes of security incidents and the security entities is preferably captured in a knowledge map that is stored, most preferably using a graph-based data structure. The TTE for security entities and their role in security incidents (captured in knowledge map) is used to create the customized TTE index for each client.

Creating the Organizational TTE Index

Figure 5:
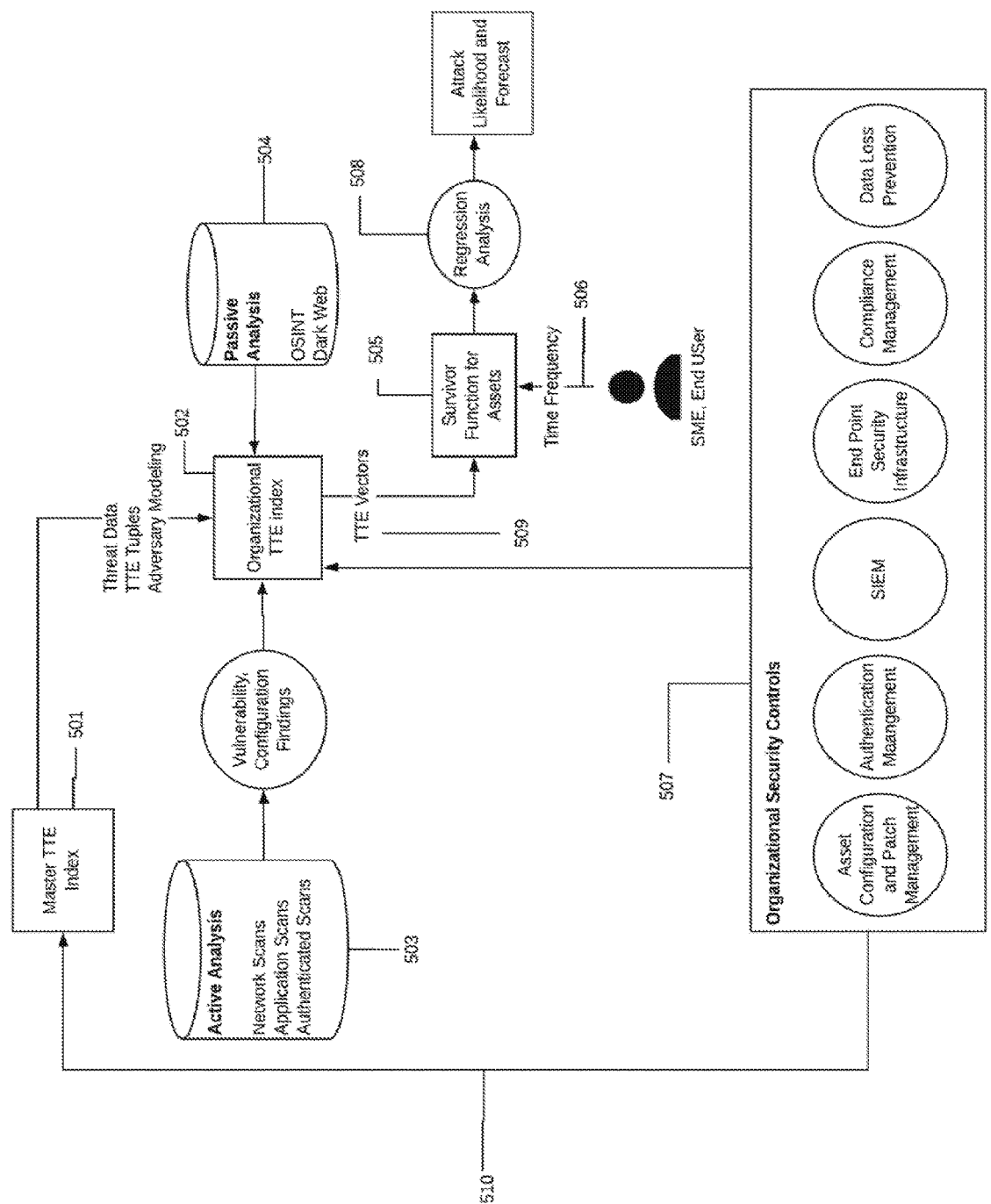
FIG. 5 is a block diagram illustrating an organizational time-to-event index of an embodiment of the present invention.

The organizational TTE index in FIG. 5 can be created from the Master TTE index 501, FIG. 4, such that survival analysis techniques can be applied on it. The survival analysis technique is preferably used to compute the TTE (in terms of time to compromise) for each asset in the organization that is further converted to likelihood of attack on that organization.

The security entities (along with their TTEs), which are pertinent to the target organization, are imported from the Master TTE index to the organizational TTE index 502. The pertinence is preferably decided by mapping the results from active security analysis 503 and passive security analysis 504 to the security entities and IoCs in the Master TTE index's knowledge map. Each mapped security entity in the Master TTE index that's imported into the organizational TTE index is preferably used to calculate a survivor function for assets on which those security entities exist 505.

For more details on the relationship between the master TTE index, organizational TTE index, security entities and security events, consider the following. As mentioned above, pertinent security entity data (along with its TTE values) are preferably imported to the organization's TTE index. A typical example for this can include: After obtaining the set of vulnerabilities (security entity) applicable to the organization from an active scan, TTE data pertaining to those vulnerabilities is preferably imported into the organizational index from the master index. However, these TTE values are preferably enhanced in real time based on other security events happening in the organization (for example, contextual enrichment). An example of a security event can include: if the endpoint solution (instance of organizational security control 507) detects a known malware signature that applies to an existing vulnerability, the TTE value for that vulnerability, in the organizational index, is then preferably updated to reflect the above security event. In cases where a known malware signature is identified and the endpoint security itself maps it to a known vulnerability, then both organizational TTE index and the master TTE index are preferably updated. The master TTE index is preferably updated using feedback loop 510 in such a case. The master TTE index is preferably updated from multiple organizational security controls on a constant basis, making it a comprehensive TTE index.

As described above, TTE can be the time-to-event on a security entity. From the example above, TTE for a vulnerability is preferably the earliest time a security event (both known and unknown) is enumerated. A similar example of a security incident is identification of a post attack indicator, which can include but not limited to an IoC, in the target organization and mapping it to a vulnerability (security entity) in the organizational TTE index and eventually in the master TTE index. In cases of post attack security incidents, TTE values can optionally be negative.

In a broader sense, the security events and security incidents are preferably gathered from organizational security controls 507. These act as contextual attributes to the security entity data in the organizational TTE index. Some examples of the contextualization can include but are not limited to: (a) security alerts generated by SIEM on a specific server; and/or (b) patch levels of a desktop obtained from the configuration and patch management solution, combinations thereof and the like.

A survival function is the complement of a corresponding cumulative distribution function. In one embodiment, it represents the probability of an asset "surviving" past a given duration without a compromise. Let f(t) and F(t) be the probability density function and cumulative distribution function for a random variable T; then the survival function is given by:

$$S(t) = P(T \geq t) = 1 - F(t) = \int_t^\infty f(\tau)d\tau$$

In order to determine the survival function for each security entity, its corresponding TTE is preferably considered from the Master TTE index. Further, to accommodate the censored data in the Master TTE index, a survival analysis tool is preferably used, which is referred to as the hazard function ($\lambda$), and which, in one embodiment, is defined as the instantaneous rate of change of survival (i.e., event occurrence) per unit time, given by:

$$\lambda(t) = -\frac{d}{dt}\log S(t)$$

The relationship between the survival function and the hazard function can be solved as follows $$S(t) = \exp[-\Lambda(t)], \text{ where } \Lambda(t) = \int_0^T \lambda(\tau)d\tau$$

The cumulative hazard function is preferably estimated using the Nelson-Aalen hazard estimator, which can be given as:

$$\tilde{H}(t) = \sum_{t_i \leq t} \frac{s_i}{\eta}$$

where $S_i$ is the number of event observations at time and $\eta$ is the number of entities currently at risk up until that time. Finally, an approximation of the survival function can be given by:

$$S(t) = \exp\left[-\tilde{H}(t)\right]$$

Calculating Estimated Survival Function for an Asset

The estimated survival function for an asset gives the probability for the asset remaining uncompromised after a certain time 't' 505. In other words, a forecast of the asset security over 't'. The higher the probability, the lesser its likelihood of being compromised based on its security posture over upcoming 't' period. Time 't' can be obtained manually and/or automatically. In manual method, the end user, which can be for example a compliance specialist or a subject-matter expert ("SME"), preferably specifies the value 506. In automated method, 't' is preferably obtained in terms of continuous time frequency (for example, weekly, monthly or quarterly forecasts). To further customize the survival forecast for the target organization, 't' can be bound to the target organization's patch cycle time that is calculated automatically using data from configuration management database ("CMDB"), configuration management System, which can be a part of the organizational security controls 507, etc.

For a given asset (A), an estimated survival function is calculated for each security entity existing on it and later aggregated. For example, if $\tilde{S}_i(t)$ can be the survival function of $i^{th}$ security entity existing on an asset, then the single survival estimate $\tilde{S}(t)$ of that asset is the weighted sum of all the $\tilde{S}(t)$ functions i.e.:

$$\tilde{S}(t)_A = \sum_{i=1}^{n} w_i * \tilde{S}_i(t)$$

The survival estimate function for each asset is preferably calculated at defined frequencies (in one embodiment the frequency can be daily). Remember that each security entity already preferably has TTEs assigned to it in the Master TTE index that are imported into the organizational TTE index.

In one embodiment, feedback loop 510 updates the TTEs of security entities in the Master TTE index based on the events observed within the organizational security controls. For example, an event observed on a particular CVE in the organization's SIEM is preferably carried back to the Master TTE index and propagated back to the organizational TTE index accordingly.

Converting the Survival Function to Likelihood Probability

Embodiments of the present invention use different methodologies to derive the likelihood of compromise probability from the survival function. As mentioned earlier, this probability significantly reduces the uncertainty while trying to assess the cyber risk of the target organization. Two methodologies are applied on the target asset for deriving the likelihood of compromise probability.

In the first methodology, a single estimated survival function is plotted as a proportion of entities surviving versus time. In this way, a point (t,s) on the survival curve represents the probability s that an asset will survive longer than time t.

In the second methodology, a Cox regression model 508 is preferably used on vectors created from the security entities existing on an asset. The vector 509 can take the form $(X_i, Y_i, \delta_i)$ where $X_i$ is the security entity (including vulnerability, threat type etc.), Y=min(T,C) is the observed TTE. T is the observed TTE (minimum of all existing TTEs), Cis the censor variable and $\delta=0/1$, a Boolean value that indicates applicability of censoring to that security entity. A Cox proportional hazards approach is preferably used to model the conditional survival function S(t|x). A conditional model is preferably built for the individual S(t|x), which is represented in terms of Λ(t|x). S(t|x) is estimated as follows for each security entity:

$$S(t|x) = 1 - \frac{\hat{S}\beta(t-b|x)}{\hat{S}\beta(t|x)}$$

Such calculated likelihood of attack for each asset is preferably propagated to the organizational level using a weighted aggregate approach. The weights are preferably determined by the criticality of each asset to the survival of the organization.

The attack likelihood probability measure is preferably used as one of the inputs to cyber risk quantification frameworks including but not limited to factor analysis of information risk ("FAIR") to derive the financial impacts from cyber-attacks of interest.

Testing Complex Application Attacks

Figure 6:
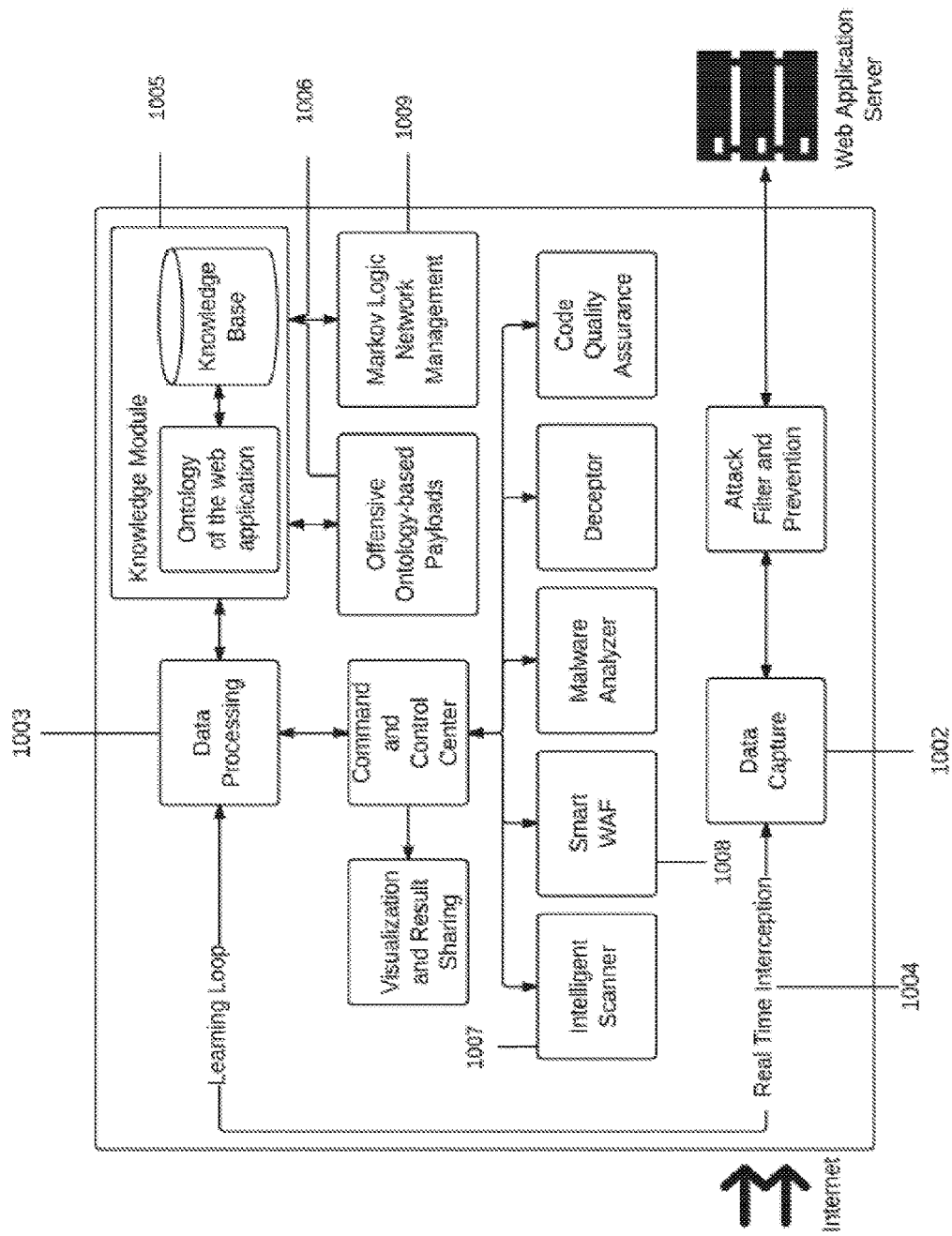
FIG. 6 is a block diagram which illustrates an operational overview of an embodiment of the present invention.

Referring now to FIGS. 6-16 generally, and especially to FIG. 6, embodiments of the present invention also relate to a solution that encompasses automated techniques directed towards identifying and preventing complex application attacks in real time. These automated techniques function like a 'hacker in the box'—capable of automating and implementing a human adversary's approach while testing and protecting applications against complex business logic attacks.

Embodiments of the present invention can automatically learn and enhance the behavior of the target application by capturing users' actions 1002 on the target application through self-learning loop, 1004.

This behavioral model represents the machine-understandable format of the application's domain, its underlying business logic and related constraints. The behavioral model is stored as knowledge base 1005 that is further used for intelligent scanning and smart WAF.

Knowledge base 1005 is preferably used to create offensive-ontology based payloads 1006 for intelligent scanning 1007 that tests target application's susceptibility for complex application attacks. These payloads are similar to syntactically valid data Fiat evade existing security solutions and exploit any underlying complex application logic attacks.

The knowledge base can also be used in smart WAF mode 1008 that detects and prevents complex application attacks in real time using stochastic probabilistic measures implemented on the knowledge base, for example generating a Markov Logic Network (MLN) and using it for static and dynamic detection of complex application attacks 1009 in near real time.

General Operating Environment

Figure 7:
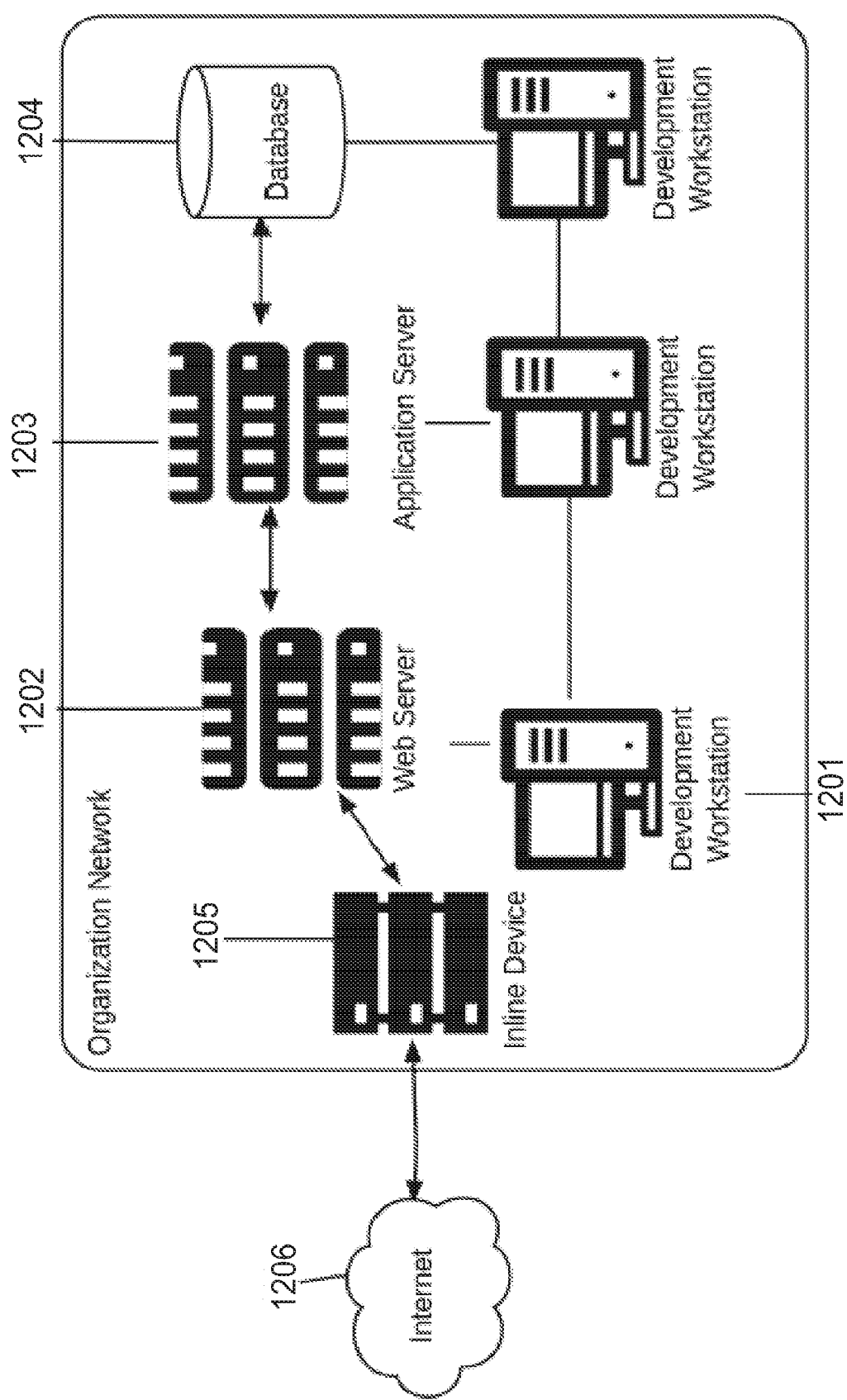
FIG. 7 is a drawing which illustrates a general operating environment.
Figure 8:
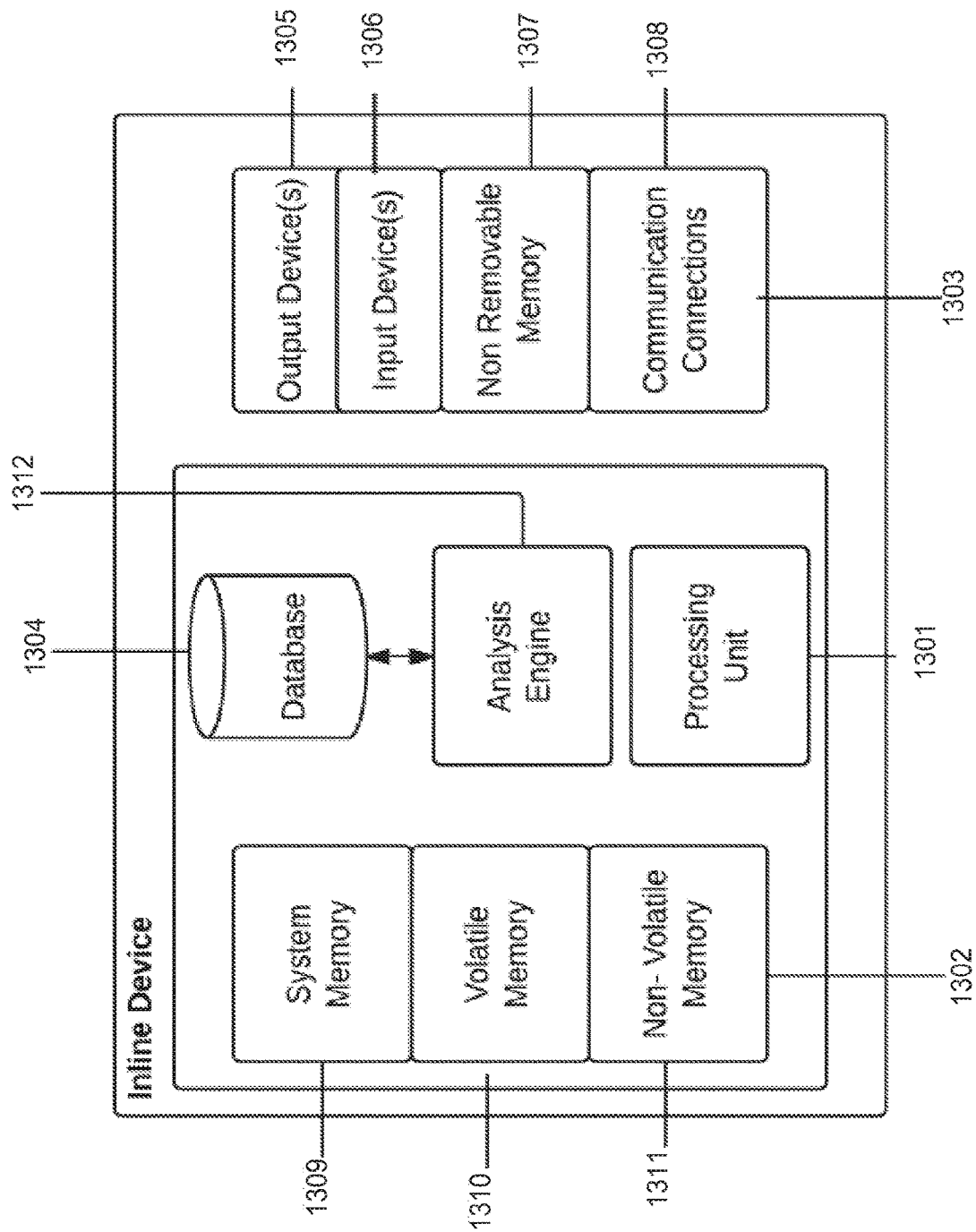
FIG. 8 is a drawing which illustrates a configuration for an inline device.

A general operating environment according to an embodiment of the present invention preferably uses functioning components as illustrated in FIG. 7.

In one embodiment, an inline device 1205 and has a dual communication architecture using HTTP (S) protocol with an organization's web application infrastructure and publicly accessible Internet.

The organization's network preferably includes a web application infrastructure having at least one web server 1202 accompanied by one or more application servers 1203 (hosting business logic) (optional implementation) and a database 1204 for storing data at rest.

Preferably, the web application infrastructure is constantly updated and maintained by a series of workstations 1201 that can either be implementing code changes or patch updates to the underlying software and hardware infrastructure.

In its most basic configuration, the inline device includes at least one processing unit 1301 and memory such as system memory 1309, volatile memory 1310 and non-volatile memory 1311. Additionally, the inline device preferably comprises features to connect external media, for example connecting output devices 1305 and/or accepting connections from a network like web server connection as exemplified in FIG. 8 configuration diagram. The device can also have multiple data storage components like database that can follow a relational representation structure or non-structured query language ("non-SQL") (schema less) style or a quasi-architecture.

Usage Modes

Figure 9:
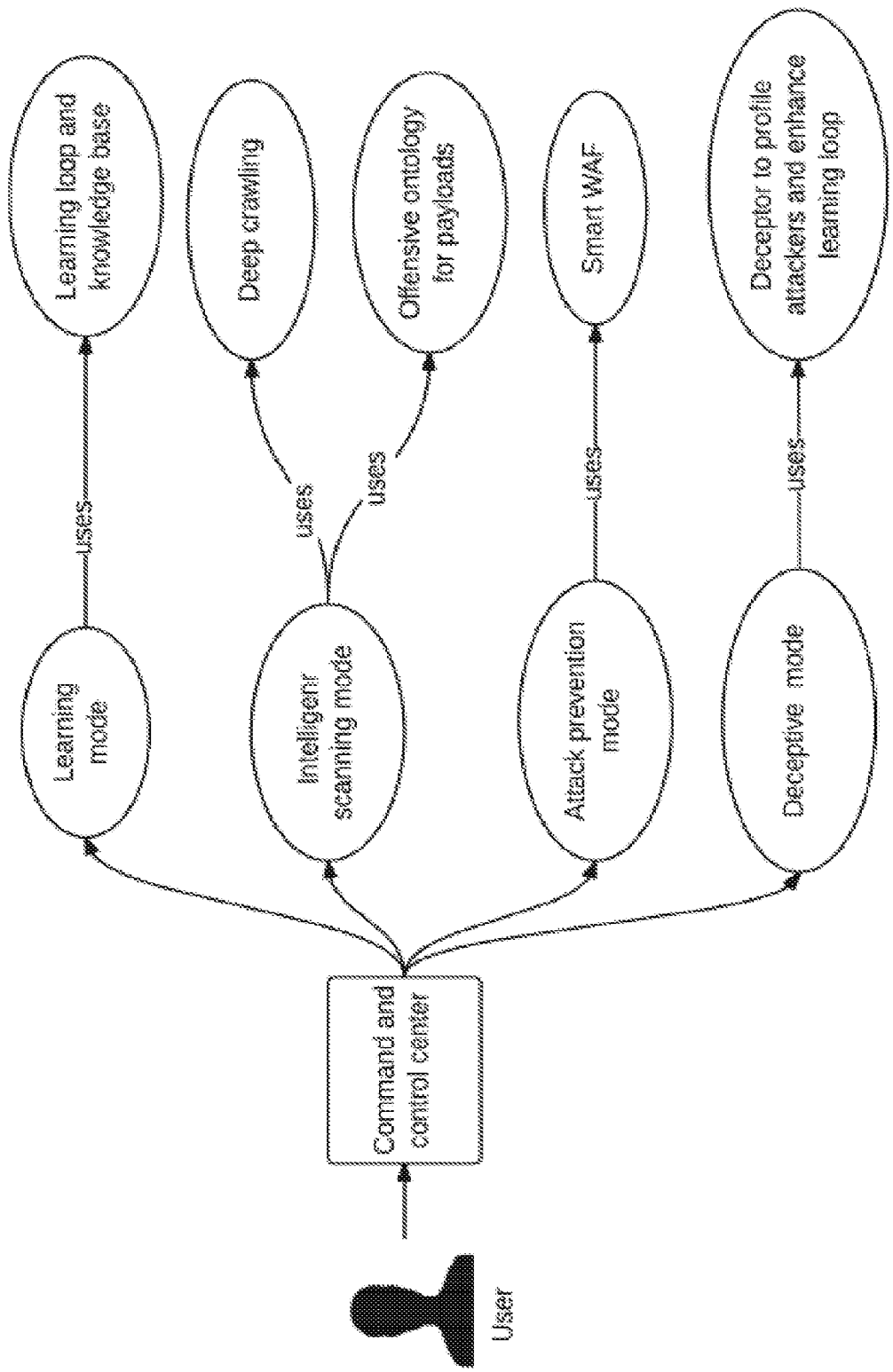
FIG. 9 is drawing which illustrates various usage modes according to an embodiment of the present invention.
Figure 10:
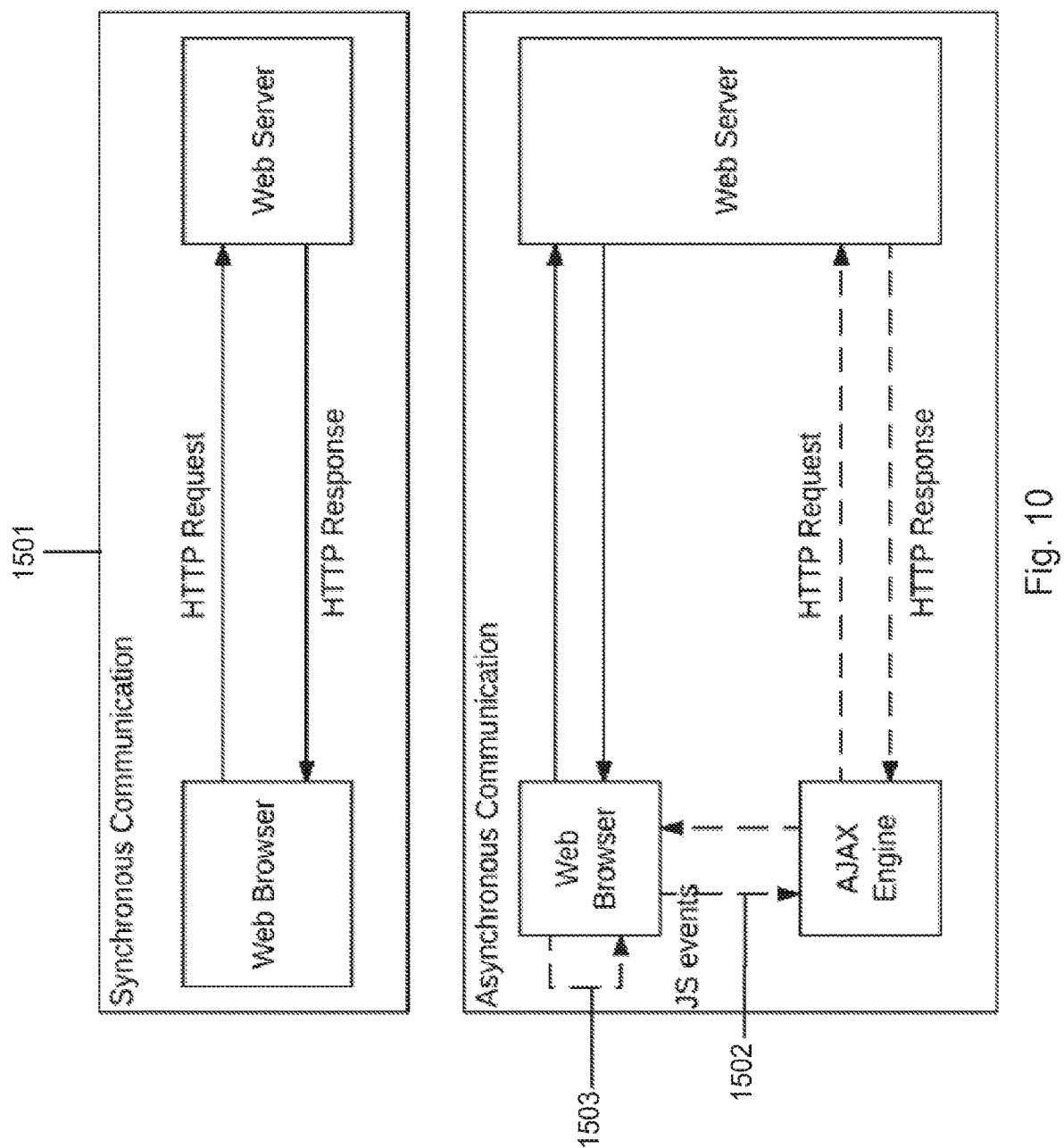
FIG. 10 is a drawing which illustrates synchronous vs asynchronous communication mechanisms.

FIG. 9 illustrates the multiple usage modes of an embodiment of the present invention. Optionally, users of an embodiment of the present invention can enable, and/or disable one or more of the following modes using a command and control setting:

1. Learning mode: This mode preferably allows for the creation of a behavioral model of the target application based on its end users' actions. During the learning mode, target application's users are allowed to perform legitimate actions on it that are captured and processed in real time using an intelligent interceptor. The processed data is also preferably used to create the behavioral model (stored as a knowledge base) of the target application. The learning mode is preferably enabled by default and stays likewise until explicitly turned off. Particularly desirable results can be obtained if the learning mode is always enabled because it allows this embodiment of the present invention to iteratively self-enhance the knowledge base.

2. Intelligent scanning mode: In this mode, an embodiment of the present invention can be used as an intelligent scanner that has capabilities to enumerate the target application's topology and create a comprehensive attack surface using the data gathered and processed in the learning mode. Further, in one embodiment, the invention can be used to derive offensive ontology-based payloads from the knowledge base created during the learning mode. In one embodiment, an intelligent scanner creates offensive ontology payloads. These payloads are further used to detect target application's susceptibility to complex web application attacks while static scanning.

3. Attack prevention mode: This mode activates smart WAF that uses stochastic probabilistic measures to detect complex application attacks in real time and generate corresponding alerts.

4. Deceptive mode: This mode allows an embodiment of the present invention to activate the underlying honeypot technology to gather payloads from potential attacks and enhance the knowledge base by linking them to the self-learning loop from the learning mode.

Data Capture And Content Hierarchy

Figure 11:
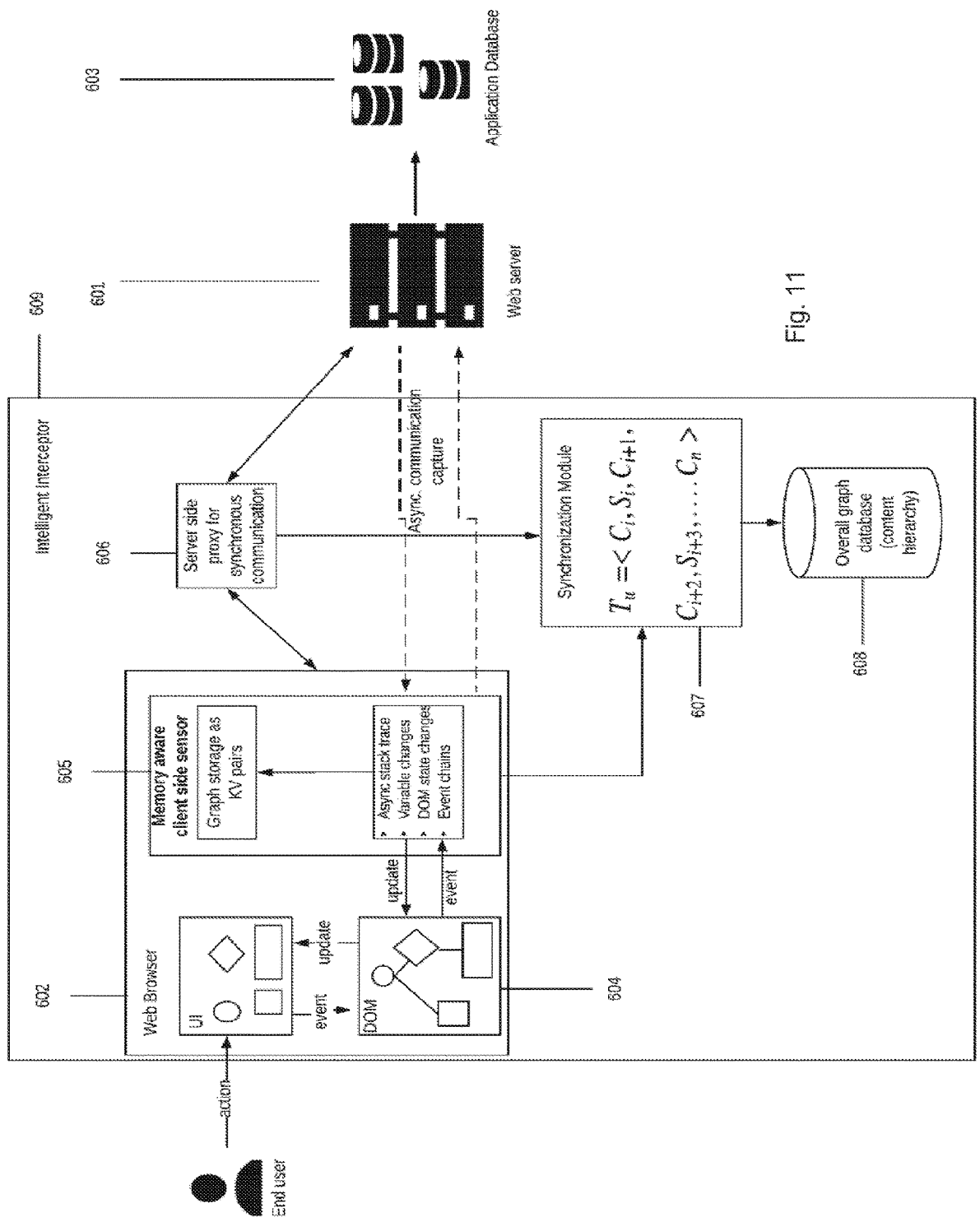
FIG. 11 is a drawing which illustrates a data capturing system according to an embodiment of the present invention.

FIG. 11 illustrates the data capturing process of the learning loop 1002, 1004 in detail where 601 represents a web server (serving web pages of the target web application) and 602 is a client side web browser that is used to access target web application. The end goal of the data capturing process is to enumerate the complete topology of the target web application that will further aid in creating a comprehensive application attack surface.

A web server preferably hosts and serves web pages to end-users. Typically, this is done when the end user (via a web browser) generates an HTTP request for a required web page and the web server serves the corresponding web page through HTTP response. The web page returned can also include hyperlinks to other such pages (serving different content) and/or functionality that will allow users to access sub-sequent web pages from the web server.

Functionality usually represents a set of actions that end users can perform on target web pages to satisfy their use cases. For example, submitting a filled form, selecting and adding items of interest to a cart in an ecommerce application etc. Additionally, in some cases end users might access, modify or create data in the backend database 1603 connected to the web server through their actions on the web pages.

Although the implementation is described with respect to documents that are web pages, it is implicit that the environment may include any data, content, or objects including but not limited to: extensible markup language ("XML"), asynchronous Javascript and XML ("AJAX"), hypertext markup language ("HTML"), extensive hypertext markup language ("XHTML"), cascading style sheets ("CSS"), JavaScript object notation ("JSON"), and representational state transfer application program interfaces ("REST" or "RESTful" APIs"), etc. While it is not shown in the illustration, embodiments of the present invention also support scenarios where multiple users (via multiple web browsers) can be accessing and performing actions on the same target web application simultaneously.

It should be noted that despite referring to HTTP request, response sequences as the compatible format, in one embodiment, the present invention can be seamlessly extended to process other application requests, response sequences as well like REST API request, response sequences.

Web pages provide Document Object Model ("DOM") elements 1604 (see FIG. 11) as part of User Interface ("UI") on which end users perform actions during their interaction with the target application. User actions on DOM elements generate events (handled by event listeners) that can update the DOM element state, eventually updating the DOM structure of the entire web page. For example, when a user enters his username in the username text field and clicks next, he can be presented the password text field in case his username is correct. In this scenario, the username text field is the DOM element, entering username and clicking the submit button are actions performed by the user, validating the username in the event generated by the action performed and appearance of the password field on the web page is the new DOM element which updates the existing DOM structure of the target web page.

Note that events generated as a result of end user actions and underlying logic implementation for handling those events preferably define the behavioral model of the web application. Embodiments of the present invention provide an automated methodology to create such behavioral model of the web application and further represent it in a machine understandable format for deriving inferences.

Embodiments of the present invention implement a data capture module that captures and processes application requests, responses in their totality as users interact with the target web application. The data capture module preferably considers all kinds of application requests, response sequences between the web server and its end users. Primarily, they can be categorized into (a) Server side request, response sequences and (b) Client side request, response sequences. These are exemplified in FIG. 10.

The server side request, response sequences represent synchronous communication between the client and the target web server i.e., they are traditional GET and POST HTTP requests between the client and the server where each response from the server entirely replaces the currently displayed web page on the client side (as represented in 1501). Client side request, response sequences represent asynchronous communication between the client and the server (using technologies like client side JavaScript, AJAX etc.) 1502, 1503 i.e., they modify the Document Object Model ("DOM") state of target web page without having to reload the web page completely. Applications implementing client side request, response sequences are referred to as Rich Internet Applications ("RIAs").

The memory-aware client-side sensor 1605 preferably resides at the web browser level. All request, response sequences that are results of end user actions including asynchronous JavaScript, AJAX events, corresponding parameter value changes are preferably intercepted and stored by the memory-aware client side sensor. During the web page load, the memory-aware client side sensor preferably loads the initial DOM structure (say D) of the target web page within its memory. From then on, it preferably intercepts and captures the full stack trace of all asynchronous JavaScript, AJAX callbacks, corresponding event handlers and parameter value changes resulting from user actions on the target web page.

All such captured data is preferably stored using a graph-based database using key-value ("KV") pairs. Each KV pair represents all details related to a DOM element state change. The KV pairs preferably act as an audit log where executing a sequence of KV pairs ($KV_1$, $KV_2$ . . . , $KV_n$) on D shall produce a resulting DOM structure (say D',) that the end user obtained through his actions represented by ($KV_1$, $KV_2$ . . . , $KV_n$).

While the stack trace allows the capture and reproduction of the DOM structure, it is also preferable to capture all intermediate states and parameter values corresponding to those intermediate states. This is preferably accomplished through event chains that capture all variables (application parameters) and their corresponding values as they propagate through different states resulting from a chain of events based on end user actions. These event chains are preferably also interleaved into KV pairs. In summary, KV pairs are preferably used to store and reproduce all DOM state changes (along with underlying variable value changes) that occur in the target application.

The synchronization module 1607 creates a transaction log that preferably coherently links data captured and stored by both server level interception and memory-aware client interception (the client level proxy). A transaction log is a collection of transaction units that are collected over time. Each transaction unit is a tuple that sequentially aligns the KV pairs from client side and server proxy sorted by time order. Heuristic measures are preferably used in real time to determine the time range under which the KV pairs are considered for a given transaction unit.

A transaction unit $T_u$ can be defined as a tuple $<C_i, S_i, C_{i+2}, C_{i+3}, S_{i+3} \ldots C_n>$ where $C_k, S_k$ are KV pairs (from client and server side proxies respectively) representing actions performed by users between time period ($t_i, t_n$). Because each KV pair represents details pertaining to a DOM state change, a transaction unit represents all DOM state changes captured by the client and server side proxies. This makes the transaction log (collection of all transaction units over a time function) a comprehensive representation of all possible states that can occur in the target web application as results of end user actions.

The transaction log is preferably stored in a graph database that acts as the raw source for the Knowledge Base (KB). The graph database created from transaction log can be referred to as content hierarchy 1608.

The content hierarchy can be considered as the target application's topology and typically represents the complete application structure when created during the learning phase. In one embodiment, this is a pre-requisite step for a successful enumeration of the application attack surface. In one embodiment, the content hierarchy is considered as an equivalent to the crawl structure as created by DAST solutions. However, it does not suffer from any of the drawbacks that DAST solutions have, because the content hierarchy captures all asynchronous events successfully.

In one embodiment of the present invention, the content hierarchy preferably includes two components, namely: intra and inter content hierarchy. The intra content hierarchy represents content structure derived from KV pair representation of intercepted asynchronous communication data and the inter content hierarchy represents content structure derived from KV pair representation of synchronous communication data. The content hierarchy 1608 can be represented as labeled directed graph CG, which is a three-tuple entity:

$<CG_v, CG_e, L>$ where: $CG_v$ is the set of vertices representing web pages 1701 (see FIG. 12) from inter content hierarchy or DOM elements 1702 from intra content hierarchy. Each $cg_v \in CG_v$ either represents a web page from inter content hierarchy or a DOM element from the intra content hierarchy in a web page. $CG_e$ is a set of directed edges between vertices of CG i.e., each $(cg_{v1}, cg_{v2}) \in CG_e$ when $cg_{v2}$ can be reached from $cg_{v1}$ in either inter content hierarchy or intra content hierarchy.

Therefore, each $cg_e \in CG_e$ are either:
1) In-links and out-links between DOM elements in the intra content hierarchy; or
2) In-links and out-links between web pages in the inter content hierarchy.

L is a labeling function that assigns linguistic attributes to all $cg_v \in CG_v$ as derived from intra and inter content hierarchy. Examples of linguistic attributes are values assigned to DOM element variables, DOM elements variable names etc. More details on how the linguistic attributes are used to create the application ontology are presented next.

Figure 12:
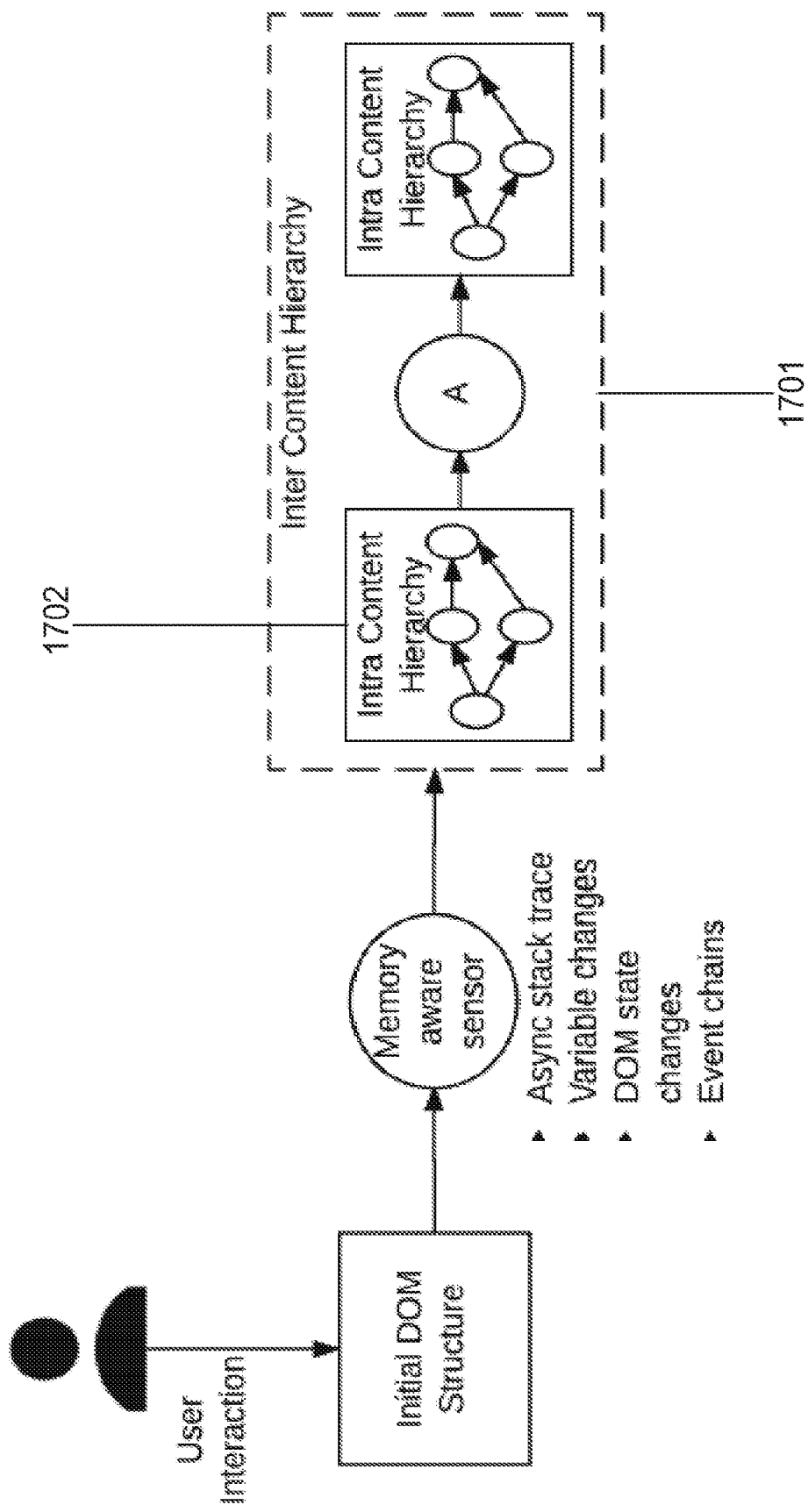
FIG. 12 is a drawing which illustrates a content hierarchy.

Because everything is stored in a graph database using KV pairs, a graph union operation between intra and inter content hierarchy can be used to derive the final content hierarchy. This is illustrated in FIG. 12.

Creating the Knowledge Base

Figure 13:
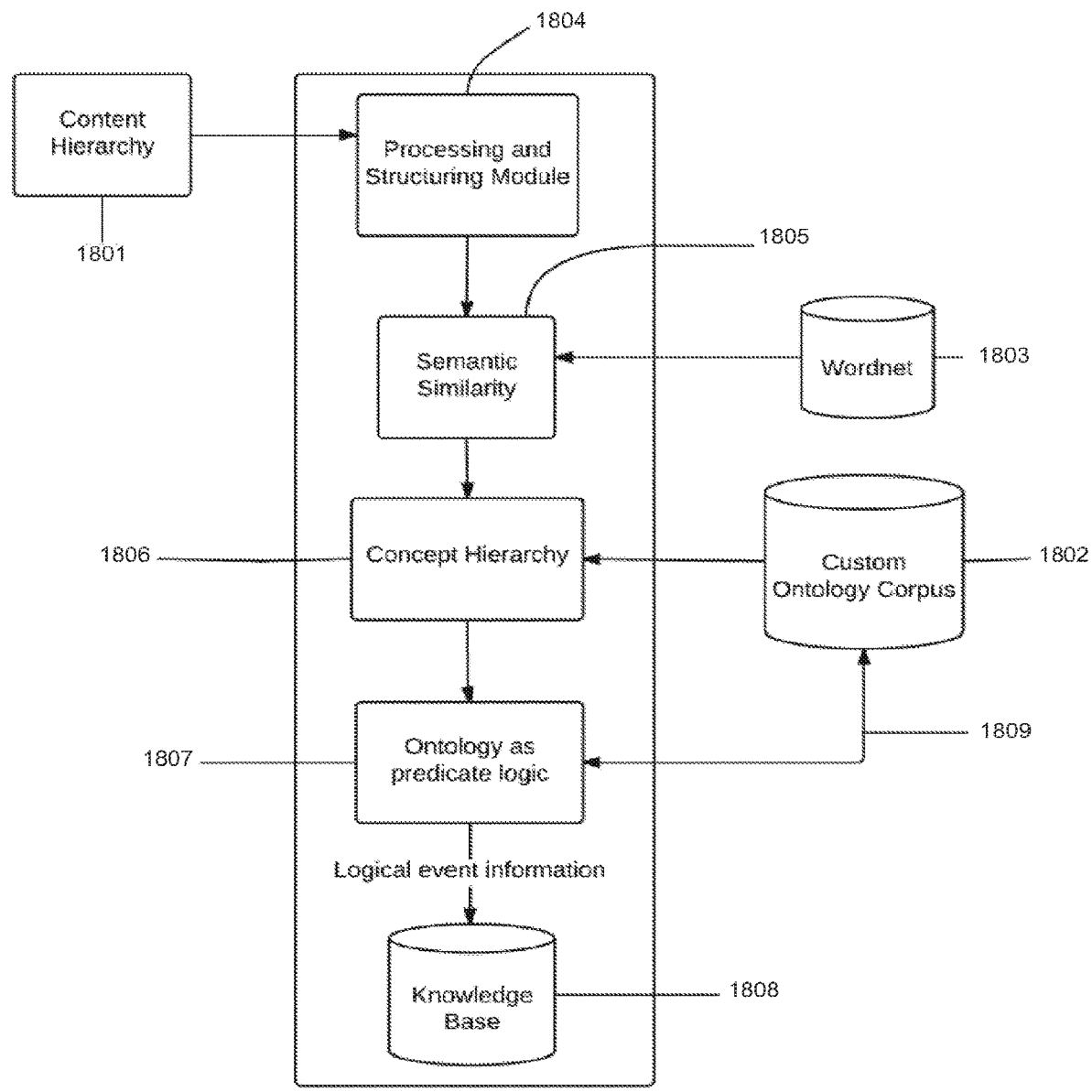
FIG. 13 is a drawing which schematically illustrates an overall ontology derivation.

The content hierarchy obtained from the intelligent interceptor 1609 is preferably used to derive the application ontology. The application ontology enhances the knowledge base of the target application, because it represents (in machine understandable format) the application's behavior resulting from user actions. FIG. 13 illustrates the overall ontology derivation process flow using three inputs (a) Content hierarchy 1801; (b) Ontology corpus 1802; and (c) Wordnet database 1803. The ontology derivation process preferably starts with processing the content hierarchy to obtain the corresponding concept hierarchy. While the content hierarchy represents the application topology, the concept hierarchy represents the semantic relationships between different elements of the content hierarchy. This is preferably achieved by applying semantic similarity measure techniques on linguistic attributes of nodes in the content hierarchy. In other words, the concept hierarchy is derived from the semi structured mark-up representation in the content hierarchy. Finally, the application ontology is derived from the concept hierarchy preferably using ontology matching techniques.

Obtaining Concept Hierarchy From the Content Hierarchy

Processing and structuring module 1804 preferably processes the data from content hierarchy. The content hierarchy is a graph representation of intra and inter content hierarchy along with respective linguistic attributes. The processing and structuring module hierarchically clusters the linguistic attributes of all nodes in the content hierarchy (both inter and intra content hierarchy) based on the tags enclosing them.

The processing and structuring module preferably extracts all content in the intra content hierarchy between the markup tags within target web pages and classifies it based on enclosing markup tags like <h1>, <b>, <i>, <li> etc. The classified content is preferably further annotated to establish its structural and linguistic attributes. Structural attributes of the content are preferably established by identifying its link structure within target web pages i.e., for a given content $c_i$ with markup $mc_i$, its in-links (immediate markups leading to $mc_i$ and DOM (client side), events leading to $mc_i$) and out-links (immediate outgoing markup links from $mc_i$ and DOM (client side), events from $mc_i$) markups are identified.

While in-links and out-links represent the direction of the content flow, the events that generate those in-links and out-links represent the relationship between the content within target web pages. For example, if $mc_i$ is generated by an onfocusout( ) JavaScript event on $mc_j$, then the onfocusout( ) event is the relationship between the content enclosed by $mc_i$ and $mc_j$.

Linguistic attributes of $c_i$ are preferably established by determining (a) $c_i$'s importance and type in $mc_i$; and (b) the context of the web page to which $c_i$ belongs in the target web application. For example, $c_i$ inside <h1> tag is annotated with high priority than $c_j$ within <p> markup, since <h1> is hierarchically superior to <p> in HTML markup. Similarly, $c_x$ within <keywords> markup tag provides metadata about target web page and $c_y$ enclosed within <checkbox> markup establishes that it is related to user's choice etc.

The processing and structuring module preferably applies the following process on the inter content hierarchy: all content related to inter content hierarchy is extracted from the content hierarchy and is annotated with respective structural and linguistic attributes. Structural attributes of the content are established by identifying in-links and out-links (source and destination URLs in this case, since this is a result of synchronous communication) of web page transitions and associated parameter values.

Linguistic attributes for inter content hierarchy are preferably established by identifying and processing events that trigger web page transitions i.e., linguistic attributes identify the relationship between different web pages. For example, all form fields successfully filled and submitted through a login web page ($WP_i$) could produce a sub-sequent user profile page ($WP_j$). In this case, the form submit event is the relationship between $WP_i$ and $WP_j$ and the content within them.

The semantic similarity module 1805 preferably establishes the semantic meaning of linguistic attributes in intra and inter content hierarchy. Primarily, the semantic meaning of the content enclosed within markups and the events (that link different markups) themselves is established i.e., the sentences and words in the content and events are considered as the source word dataset.

To derive the semantic meaning of the content, sequence of preprocessing steps is preferably applied on sentences, words in the word dataset to establish the sense of each word. The preprocessing steps are: tokenization, tagging, stemming and Wordsense Disambiguation ("WSD"). Tokenization allows the elimination of insignificant words in the target word dataset i.e., eliminate stop words, articles etc. Tagging helps identify the correct Part of Speech ("POS") of the words obtained from tokenization. Stemming produces the finite state lexicon for words by removing common morphological and inflectional endings of words. Finally, the WSD is applied to identify the most appropriate sense of a word in each sentence. This is preferably achieved using the Lesk algorithm. After obtaining the sense of words in the word dataset, each of the words is preferably subjected to a semantic similarity measure with Wordnet to obtain the concept hierarchy.

Wordnet is a lexical database that provides a large repository of English lexical items. The smallest unit in a Wordnet is a synset that represents specific meaning of a word. Synset also includes the word, its explanation and its synonyms. Synset is preferably used as a baseline to derive the semantic meaning of words in the content (between markups) and events (derived from the content hierarchy) between the markups. This is preferably done by implementing a hybrid semantic similarity measure between word sense (obtained as a result of preprocessing on word dataset) and synset. The hybrid semantic similarity measure can be represented as follows.

$$\text{sim}(c_1, c_2) = 1 - k\left(\frac{\log(\text{len}(c_1, c_2) + 1)}{\log(2 * (\text{deep}_{max} - 1))}\right) - (1 - k) * \left(IC(c_1) + IC(c_2) - 2 * \frac{IC(Iso(c_1, c_2))}{2}\right)$$

The process of deriving semantic meaning of content hierarchy can be summarized as follows. All words, sentences belonging to content (within markups) and events (between markups) as derived from linguistic attributes in intra and inter content hierarchy are subjected to preprocessing to derive respective word sense.

Semantic meaning to word sense is preferably established by performing semantic similarity measure between the word sense and corresponding synset (from Wordnet). Finally, sematic meaning of the words in the content and events is derived. The content hierarchy mapped to its semantic meaning is termed as concept hierarchy 1806. Therefore, the concept hierarchy represents a is-a relationship of the word dataset within content hierarchy. Technically, the concept hierarchy is preferably represented in a Resource Description Framework ("RDF") format.

Creating Application Ontology from the Concept Hierarchy

The ontology of target application is preferably derived from the concept hierarchy using ontology matching process. While the concept hierarchy represents the is-a relationship of the content in the target application, it is helpful to convert this to a machine understandable format (knowledge base in this case) that can be further used for inferences. To derive such a knowledge base, the concept hierarchy is preferably converted into an ontology and the ontology is represented using first order predicate logic.

In one embodiment, the ontology derivation process includes two primary steps: (a) ontology matching, and (b) converting ontology to predicate logic representation. Ontology matching is performed between the concept hierarchy (raw ontology) and the custom derived ontology corpus. Remember that the concept hierarchy already has semantic meaning of the content classified by its priority (using the markup structure) in the target web application. This classification of content in the concept hierarchy is a key criterion used for ontology matching.

The ontology corpus preferably includes a collection of ontologies created from web application security testing experience. For example, in building one corpus, all web applications were tested for security and categorized into broad categories like Content Management Systems ("CMSs"), financial applications (online banking and stock trading applications), Healthcare (health insurance portability ("HIPAA") applications)), accounting applications, hospitality applications, government (web portals, first responder, business-to-business ("B2B") applications), online shopping portals, gaming industry applications and critical infrastructure applications.

Ontologies are then preferably derived from each of the applications belonging to all categories by crawling them, closely following the business logic and representing it in the database, thus crating a master corpus of ontology.

An assumption behind performing ontology matching is that the target application for which a need to derive ontology shall fall under one of the categories which already has an ontology defined in the ontology corpus.

The ontology matching process is preferably used to find the closest ontology to the concept hierarchy in the ontology corpus and then derive its behavioral model from there on. The ontology matching is preferably performed by measuring the distance between the two target ontologies.

Given the RDF of the concept hierarchy and the ontology corpus, the node similarity distance (to derive the concept similarity first) is preferably computed as follows and then extend it to ontology distance. Given a category X together with the set of relationships it is involved in N(X), the similarity measure $\text{Sim}_x: X2 \rightarrow [0, 1]$ is preferably defined as follows:

$$\text{Sim}_x(x, x') = \sum_{F \in N(x)} \prod_P^x M \ \text{Sim}_y(F(x), F(x'))$$

The function is normalized, i.e., the weights $$\prod_P^X M \text{ sum to one}, \sum_{f \in N(x)} \prod_P^x = 1$$

The set functions $\text{MSim}_Y$ preferably compare two sets of nodes of the same category. Once the concept similarity $\text{Sim}_X$ is established, the ontology measure value is preferably computed from the concept measure values. This is preferably accomplished using a collection measure ($\Delta$), in this case minimum weight maximum graph matching distance measure. After mapping the concept hierarchy to respective ontology (in the ontology corpus) through ontology mapping, the predicate logic representation of the concept hierarchy follows the model implemented for the matched ontology 1807. On the flip side, the gap between the ontology corpus is preferably also updated with gaps observed while computing the similarity measure 1809. For example, if the target application is an online travel ticket booking application, its ontology is derived by matching its concept hierarchy to closest set of entities and relationship in the ontology corpus. Because the ontology corpus already has the predicate logic representation of entities and religionists, this predicate logic represented is adapted for the target application.

Representing Ontology Using Predicate Logic

Ontology representation of two scenarios from the online travel ticket booking portal is illustrated below.

Scenario 1: A user books a trip $\forall x, y: (books(x,y) \rightarrow User(x) \wedge Trip(y))$ Scenario 2: A user can apply a coupon only once during checkout $\forall x \forall t: Apply(x,t) \rightarrow IsCoupon(x) \wedge Checkout(t)$
$\forall x \forall t: IsCoupon(x) \wedge Apply(x,t) \rightarrow Valid(x)$
$\forall x \forall t \forall n \neq 0: IsCoupon(x) \wedge Apply(x,t) \wedge Apply(x,t+n) \rightarrow \perp Valid(x)$
$\forall x \forall t: \perp Valid(x) \rightarrow \perp Apply(x,t)$ Finally, the content hierarchy, concept hierarchy and the predicate logic representation of the target application's ontology together create the application's knowledge base. The predicate logic representation of the application's ontology is used to detect complex business logic attacks during security scanning process, because predicate logic can be represented in a machine understandable format and required computations can be applied on such data.

It is evident from the above methodology that the data captured from user actions in raw semi structured format (the content hierarchy) is converted to machine understandable format by representing it using appropriate predicate logic statements.

Overall Offensive Ontology Process

The security scanning module of an embodiment of the present invention preferably automatically generates payloads (using ontology from the knowledge base) that detect a target application's susceptibility to complex web application attacks. Offensive ontology-based payloads are preferably created and executed through three primary steps: (a) apply negation rules on the predicate logic representation of application's ontology, (b) convert the resultant predicate logic statements to a complete application request format and (c) submit the application request to the target application.

Finally, resulting application responses are evaluated to detect the existence of complex logic attacks. Because the ontology-based payloads are crafted based on known behavior (ontology) of the application by taking an adversarial approach, such payloads can be referred to as offensive ontology.

Figure 14:
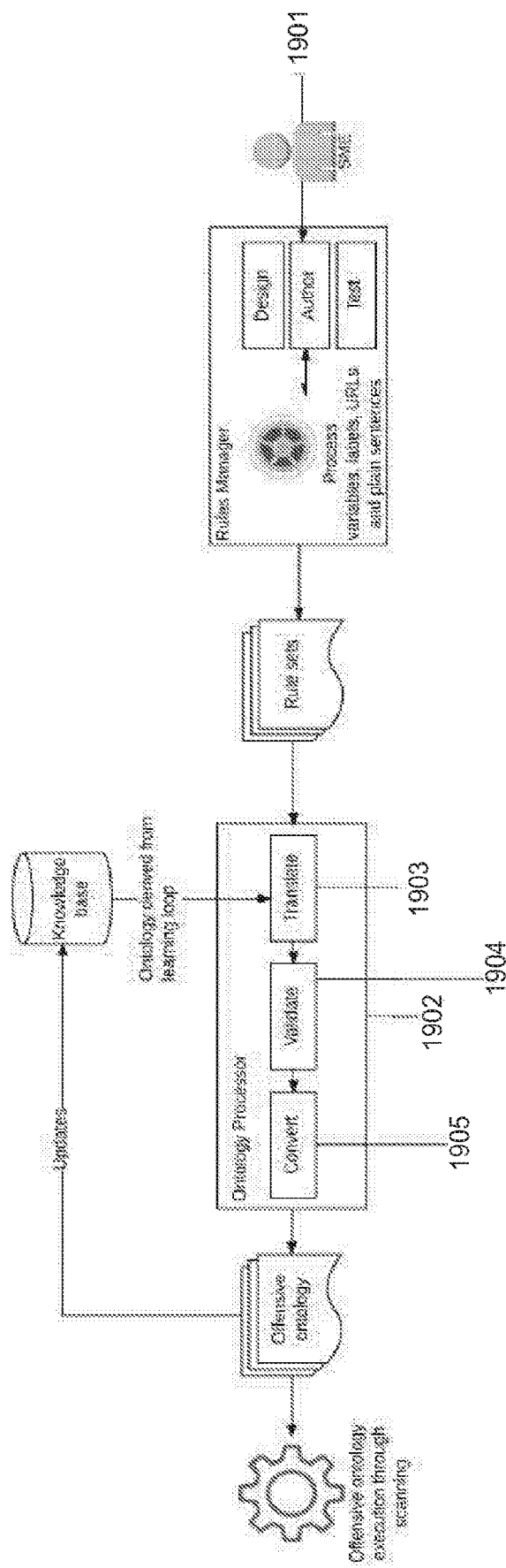
FIG. 14 is a drawing which schematically illustrates an ontology processor according to an embodiment of the present invention.

FIG. 14 illustrates an overall offensive ontology creation process. By default, the offensive ontology is automatically created from ontology in the knowledge base. In addition, customized offensive ontology can also be derived using rules specified by Subject Matter Experts ("SMEs") 1901. These rules represent complex attacks against which SMEs desire to defend the target web application. Rules can be specified on URLs, parameters, events (as derived in ontology) etc. For examples, SMEs can specify that a parameter's value cannot be greater than x, a user's session variable should not be different from that assigned by the web application logic, users cannot apply a coupon more than once during checkout, a user with low level privilege cannot access URL $U_i$ or certain DOM elements. Both the default offensive ontology and custom offensive ontology are preferably generated by the ontology processor 1902. The ontology processor accepts rule sets that are code representation (XML configuration files) of the rules derived from SMEs'
specifications and ontology from the knowledge base for generating default and custom ontology respectively.

The ontology processor preferably produces offensive ontology through three implicit features: (a) translate, (b) validate and (c) convert. The translate feature 1903 preferably accepts the predicate logic representation of the business logic categorized by user behavior and implements the negation process on it to derive the negative predicate logic (referred as offensive ontology). This methodology is expanded in detail in FIG. 15. The validate feature 1904 preferably validates the resulting negative predicate logic i.e., its completeness with respect to the ontology of the target application. The convert feature 1905 preferably converts the negated predicate logic to appropriate, valid HTTP request that is executable on the target web application. This is explained in detail in FIG. 16. Finally, the knowledge base is updated with the resultant offensive ontology that is used during scanning and attack detection process.

Figure 15:
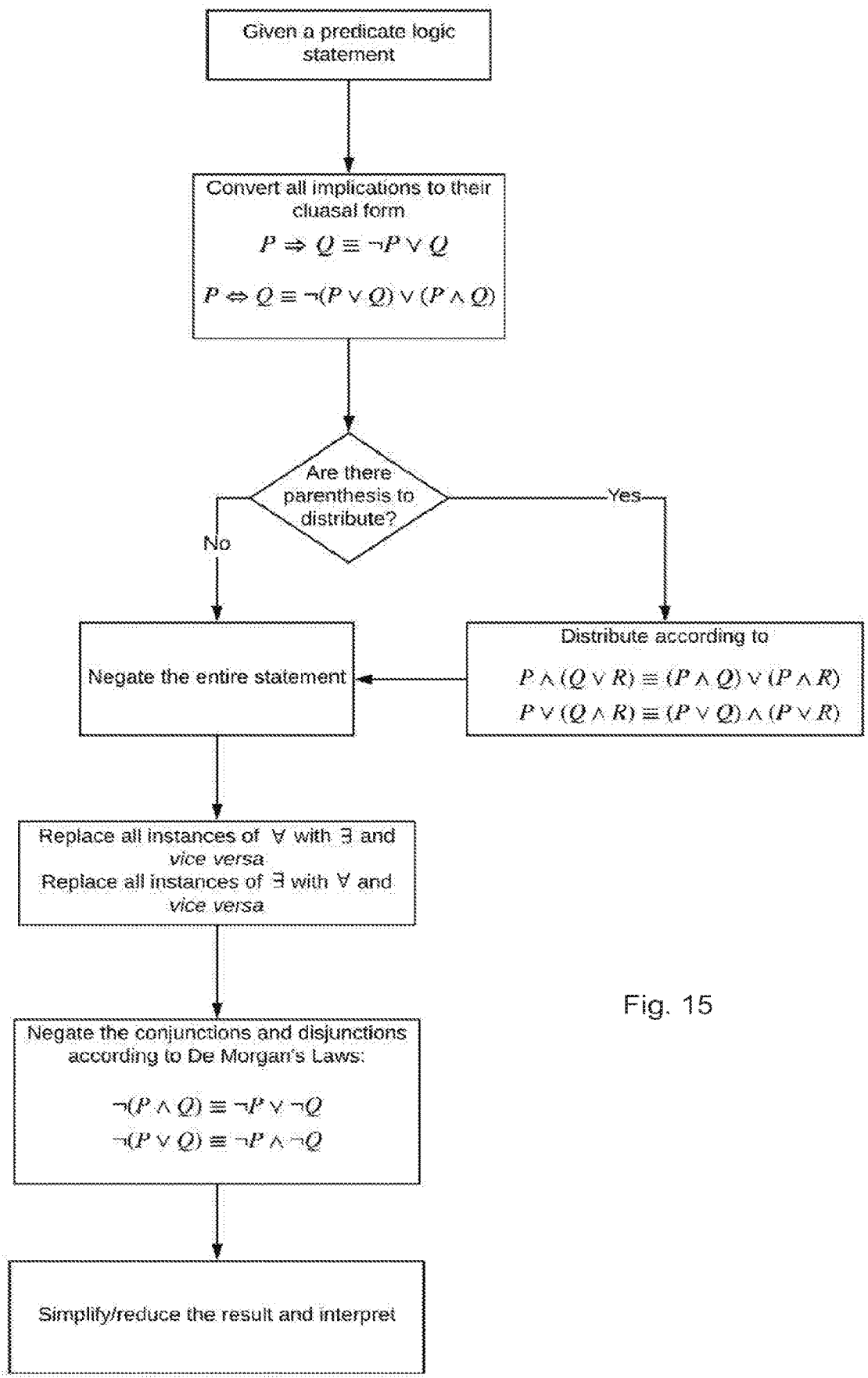
FIG. 15 is a block diagram of a logic negation process according to an embodiment of the present invention.

The offensive ontology derivation process is illustrated using negation principles in FIG. 15. Finding the logical negation of a statement can be systematized into a sequence of steps, similar to the order of operations for standard arithmetic. By deconstructing the logical statement into expanded clauses, this process can be applied to any predicate logic statement to derive the negation. In one embodiment, the process is as follows:

1. Expand all implications: Statements of the form $P \Rightarrow Q$ can be rewritten in their logically equivalent clausal form $\sim P \vee Q$. If-and-only-if statements $P \Leftrightarrow Q$ are rewritten as $P \Rightarrow Q \wedge (Q \Rightarrow P)$ and expanded again accordingly.
2. Distribute parentheticals: Compound logical statements can often be expanded according to distributive laws: $P \vee (Q \wedge R) \equiv (P \vee Q) \wedge (P \vee R)$, and $(P \wedge Q) \vee R \equiv (P \wedge Q) \vee (P \wedge R)$.
3. Negate the statement: Push the negation modifier ¬ to the entire statement, and begin to distribute it according to logical opposites:
   i. $\forall$ becomes $\exists$, and vice versa
   ii. $\vee$ becomes $\wedge$, and vice versa
   iii. Use De Morgan's Laws to negate disjunctions and conjunctions: $\neg(P \vee Q) \equiv \neg P \wedge \neg Q$, and $\neg(P \wedge Q) \equiv \neg P \vee \neg Q$, At times, De Morgan's Laws should be used in the Distribute step as well, in case of converting implications to clauses.
4. Simplify and Interpret: After all clauses of the statement have had the negation modifier applied to them, the resulting statement can be simplified and reduced, eliminating and tautologies or contradictions where necessary.

Below is an example showing the offensive ontology derivation process for the coupon scenario (using steps illustrated in FIG. 15) explained in the background section above.

Negating the Coupon Scenario $\forall x \forall t: Apply(x, t) \rightarrow IsCoupon(x) \wedge Checkout(t)$ A coupon can only be applied at checkout time.

$\forall x \forall t: \neg Apply(x, t) \vee (IsCoupon(x) \wedge Checkout(t))$ Expand implication $\exists x \exists t: \neg[\neg Apply(x, t) \vee IsCoupon(x) \wedge Checkout(t)]$ Negate everywhere $\exists x \exists t: \neg(\neg A(x, t) \wedge \neg(IsCoupon(x) \wedge Checkout(t))$ De Morgan's Laws $\exists x \exists t: A(x,t) \wedge (\neg(IsCoupon(x) \vee \neg Checkout(t))$ Simplify $\forall x \forall t: IsCoupon(x) \wedge Apply(x,t) \rightarrow Valid(x)$ A coupon may be applied only once.

$\forall x \forall t \forall n \neq 0: \neg (\text{IsCoupon}(x) \wedge \text{Apply}(x, t) \wedge \text{Apply}(x, t+n))$
$\vee \neg \text{Valid}(x)$ Expand implication $\forall x \forall t \forall n \neq 0: \neg \text{IsCoupon}(x) \vee \neg \text{Apply}(x, t) \vee \neg \text{Apply}(x, t+n) \vee \neg \text{Valid}(x)$ De Morgan's Laws $\exists x \exists t \exists n \neq 0: \text{IsCoupon}(x) \wedge \text{Apply}(x, t) \wedge \text{Apply}(x, t+n) \wedge \text{Valid}(x)$ Negate everywhere $\forall x \forall t: \neg \text{Valid}(x) \rightarrow \neg \text{Apply}(x, t)$ If a coupon is not valid, it cannot be used.

Figure 16:
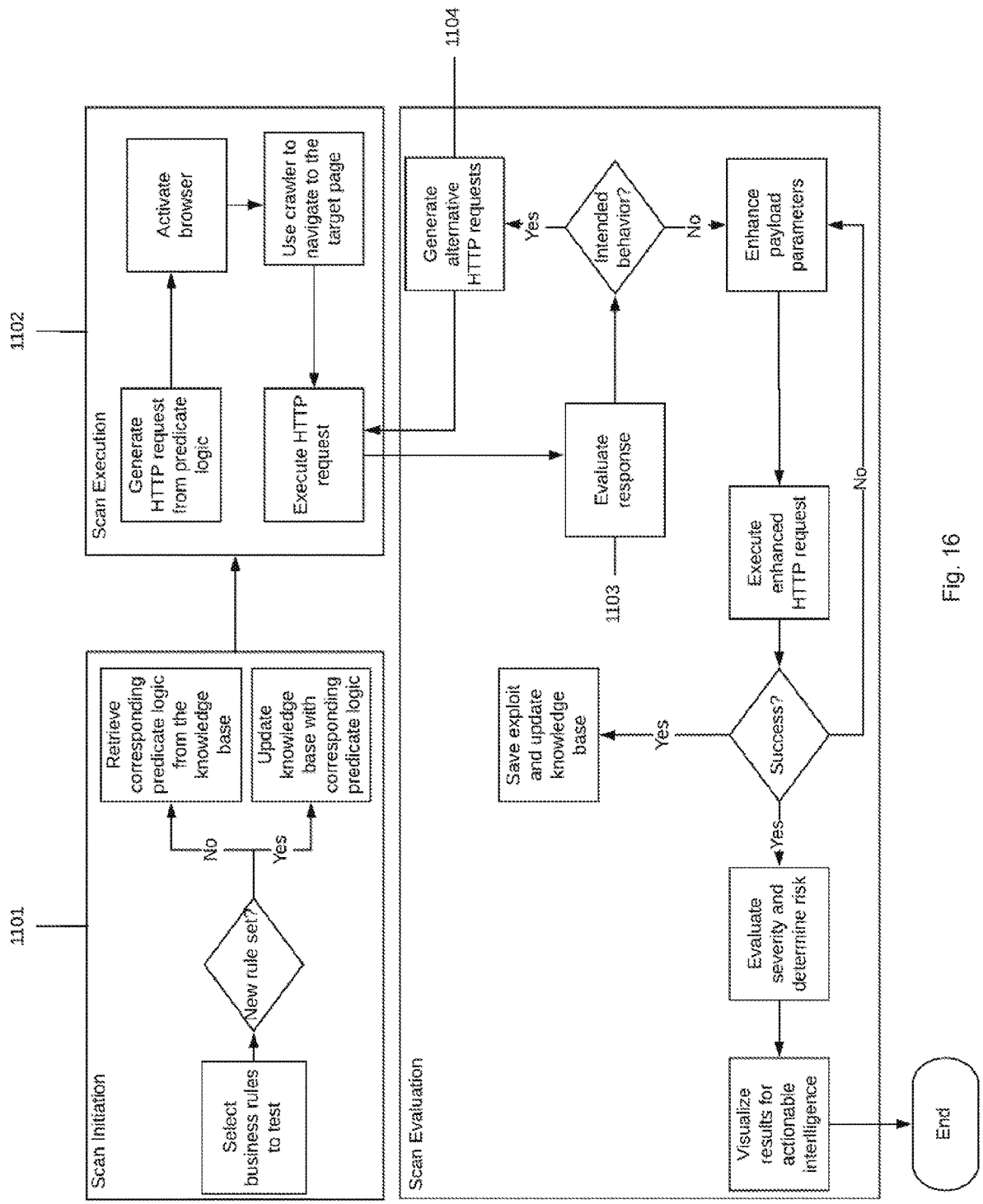
FIG. 16 is a block diagram of an intelligent scanning process flow according to an embodiment of the present invention.

$\forall x \forall t: \neg(\neg \text{Valid}(x)) \vee \neg \text{Apply}(x, t)$ Expand implication $\forall x \forall t: \text{Valid}(x) \vee \neg \text{Apply}(x, t)$ Simplify $\exists x \exists t: \neg \text{Valid}(x) \wedge \text{Apply}(x, t)$ Negate everywhere Scanning Using Offensive Ontology While the scanning module of an embodiment of the present invention implicitly has capabilities to test for standard injection—based attacks (like SOL injection and Cross-Site Scripting ("XSS")), session variable strengths, directory traversal attacks etc., its unique capability lies in executing offensive ontology against target applications to test them for any existing complex web application attacks. The scanning process flow that involves generating and using offensive ontology is illustrated in FIG. 16.

In one embodiment, the scan process is preferably initiated with selecting or defining the set of rules against which the target application is to be tested 1101. If it is a new custom rule set defined by the SME, then the corresponding offensive ontology (in form of predicate logic) is added to the knowledge base, or else an existing default rule set (as derived from the knowledge base) is selected. The selected offensive ontology from 1101 is passed as input to the scan execution phase 1102. In order to execute the scan, the security device first creates a HTTP request that matches the selected offensive ontology. This involves mapping the predicate logic of the offensive ontology to its corresponding event in the knowledge base and deriving a valid HTTP request for that event The content hierarchy stored within the knowledge base preferably has all data (like session variables, valid parameter value details, URLs etc.) required to recreate the HTTP request for any given event.

This HTTP request is preferably executed in an inbuilt browser on the target application. Next the resulting HTTP response is evaluated and enhanced as part of the scan evaluation process 1103. During evaluation, if the intended behavior occurs i.e., if the application proves to be vulnerable to complex logic attacks, then more alternative HTTP requests are preferably executed to enhance the attack vector 1104. If the intended behavior does not occur, then the HTTP request is enhanced (by improving the offensive ontology) and tried again.

The intended behavior is preferably determined by evaluating the HTTP response. If the HTTP response indicates the target application's progress to the next event, then the offensive ontology has been successful. Finally, for all successful HTTP requests i.e., in cases where the rule is successfully executed against the target web application, the severity of the underlying vulnerability is determined and visualized for users of the security device. Additionally, the corresponding offensive ontology is stored in the knowledge base for similar testing strategies in future.

Detecting and Preventing Complex Application Attacks in Real Time.

Usage Modes

FIG. 9 illustrates the multiple usage modes of an embodiment of the present invention. Optionally, users of an embodiment of the present invention can enable, and/or disable one or more of the following modes using a command and control setting:

1. Learning mode: This mode preferably allows for the creation of a behavioral model of the target application based on its end users' actions. During the learning mode, target application's users are allowed to perform legitimate actions on it that are captured and processed in real time using an intelligent interceptor. The processed data is also preferably used to create the behavioral model (stored as a knowledge base) of the target application. This behavioral model is preferably further processed to extract the corresponding master Markov Logic Network (MLN) for the application during the learning mode. The behavioral model created and the eventual master MLN is classified and stored based on the end user's privilege access level. The learning mode is enabled by default and stays likewise until explicitly turned off. Particularly desirable results can be obtained if the learning mode is enabled at all times, because it allows this embodiment of the present invention to iteratively self-enhance the knowledge base.

2. Intelligent scanning mode: In this mode, an embodiment of the present invention can be used as an intelligent scanner that has capabilities to enumerate the target application's topology and create a comprehensive attack surface using the data gathered and processed in the learning mode. Further, this embodiment of the present invention can be used to derive offensive ontology-based payloads from the knowledge base created during the learning mode. These payloads are further used to detect target application's susceptibility to complex web application attacks while static scanning.

3. Attack prevention mode: This mode activates smart WAF that uses stochastic probabilistic measures to detect complex application attacks in real time and generate corresponding alerts.

4. Deceptive mode: This mode allows an embodiment of the present invention to activate the underlying honeypot technology to gather payloads from potential attacks and enhance the knowledge base by linking them to the self-learning loop from the learning mode.

Creating the Knowledge Base (KB)

An embodiment of the present invention preferably implements a feedback learning loop that creates a knowledge base (representing user behavioral model) for the target application infrastructure from end user actions. The learning loop preferably includes:

Intelligent interceptor that captures and stores all request, response sequences between the web application and its end users;

Data processing module that produces the content hierarchy; and

Knowledge module that produces the ontology-based knowledge based and offensive ontology.

Intelligent Interceptor

The intelligent interceptor preferably captures all request, response sequence data from synchronous and asynchronous communication resulting from end user interaction with the target application infrastructure. The synchronous communication is preferably captured using a server side proxy, while the asynchronous communication is preferably captured using the client-side proxy, which can be a memory-aware sensor at the browser level.

The memory-aware sensor preferably captures and stores all request, response sequences including asynchronous JavaScript, AJAX events, and corresponding parameter value changes that are results of end user actions. During the web page load, the client-side proxy preferably loads the initial DOM structure ("D") of the target web page within its memory. From then on, it preferably intercepts and captures the full stack trace of all asynchronous JavaScript, AJAX callbacks, corresponding event handlers and parameter value changes resulting from user actions on the target web page.

Further, event chains are preferably used to capture all variables (application parameters) and their corresponding values as they propagate through different states resulting from a chain of events based on end user actions. All the above captured data is preferably stored as a graph structure using Key-Value ("KV") pairs.

The synchronization module creates a transaction log that coherently links data captured and stored by both server level interception and memory-aware client interception (the client level proxy). A transaction log is a collection of transaction units that are collected over time. Each transaction unit is preferably a tuple that sequentially aligns the KV pairs from client side and server proxy sorted by time order.

Data Processing Module—Content and Concept Hierarchy

In one embodiment, the transaction log is stored in a graph database that acts as the raw source for the Knowledge Base ("KB"). The graph database created from transaction log can be referred to as content hierarchy.

The content hierarchy can be considered as the target application's topology and typically represents the complete application structure when created during the learning phase. In one embodiment, this is a pre-requisite step for a successful enumeration of the application attack surface. In one embodiment, the content hierarchy is considered as an equivalent to the crawl structure as created by DAST solutions. However, it does not suffer from any of the drawbacks that DAST solutions have, because the content hierarchy captures all asynchronous events successfully.

In one embodiment of the present invention, the content hierarchy preferably includes two components, intra and inter content hierarchy. The intra content hierarchy represents content structure derived from KV pair representation of intercepted asynchronous communication data and the inter content hierarchy represents content structure derived from KV pair representation of synchronous communication data. The content hierarchy 1608 can be represented as labeled directed graph CG, which is a three-tuple entity:

<$CG_v$, $CG_e$, L> where: $CG_v$ is the set of vertices representing web pages 1701 (see FIG. 12) from inter content hierarchy or DOM elements 1702 from intra content hierarchy. Each $cg_v \in CG_v$ either represents a web page from inter content hierarchy or a DOM element from the intra content hierarchy in a web page. $CG_e$ is a set of directed edges between vertices of CG i.e., each ($cg_{v1}$, $cg_{v2}$)$\in CG_e$ when $cg_{v2}$ can be reached from $cg_{v1}$ in either inter content hierarchy or intra content hierarchy. Therefore, each $cg_e \in CG_e$ are either:

1) In-links and out-links between DOM elements in the intra content hierarchy; or
2) In-links and out-links between web pages in the inter content hierarchy.

L is a labeling function that assigns linguistic attributes to all $cg_v \in CG_v$ as derived from intra and inter content hierarchy. Examples of linguistic attributes are values assigned to DOM element variables, DOM elements variable names etc.

The content hierarchy obtained from the intelligent interceptor is preferably used to derive the application ontology. The application ontology enhances the knowledge base of the target application, because it represents (in machine understandable format) the application's behavior resulting from user actions. The overall ontology derivation process flow uses three inputs (a) Content hierarchy (b) Ontology corpus and (c) the WordNet database.

The ontology derivation process starts with processing the content hierarchy to obtain the corresponding concept hierarchy. While the content hierarchy represents the application topology, the concept hierarchy represents the semantic relationships between different elements of the content hierarchy. This is preferably achieved by applying semantic similarity measure techniques on linguistic attributes of nodes in the content hierarchy. In other words, the concept hierarchy is preferably derived from the semi structured mark-up representation in the content hierarchy.

Ontology-Based KB

In one embodiment, the ontology of target application is preferably derived from the concept hierarchy using ontology matching process. While the concept hierarchy represents the is-a relationship of the content in the target application, it is helpful to convert this to a machine understandable format (knowledge base in this case) that can be further used for inferences. To derive such knowledge base, the concept hierarchy is preferably converted into an ontology and the ontology is represented using first order predicate logic.

In one embodiment, the ontology derivation process includes two primary steps: (a) ontology matching and (b) converting ontology to predicate logic representation, ontology matching is performed between the concept hierarchy (raw ontology) and the custom derived ontology corpus.

Offensive Ontology

In one embodiment, offensive ontology-based payloads are preferably created and executed through three primary steps: (a) apply negation rules on the predicate logic representation of application's ontology, (b) convert the resultant predicate logic statements to a complete application request format and (c) submit the application request to the target application and evaluate the response. By default, the offensive ontology is automatically created from ontology in the knowledge base. In addition, customized offensive ontology can also be derived using rules specified by Subject Matter Experts.

Overall MLN Process

In one embodiment, Markov Logic Networks ("MLNs") are preferably used to predict complex application attacks in real time due to the following reasons:
  a) The domain knowledge of the application has already been obtained and represented as predicate logic statements.
  b) The hard constraints around predicate logic inference can be softened by deriving grounded formulae and implementing different proven probabilistic inference methods on the grounded formulae. The constants used in the grounded formulae are unique identifiers assigned to each user according to the business logic of the target web application.
  c) The probabilistic inference is effective in cases where inferences need to be derived while dealing with unpredictable user behavior, which is common for majority of web application users.

Figure 17:
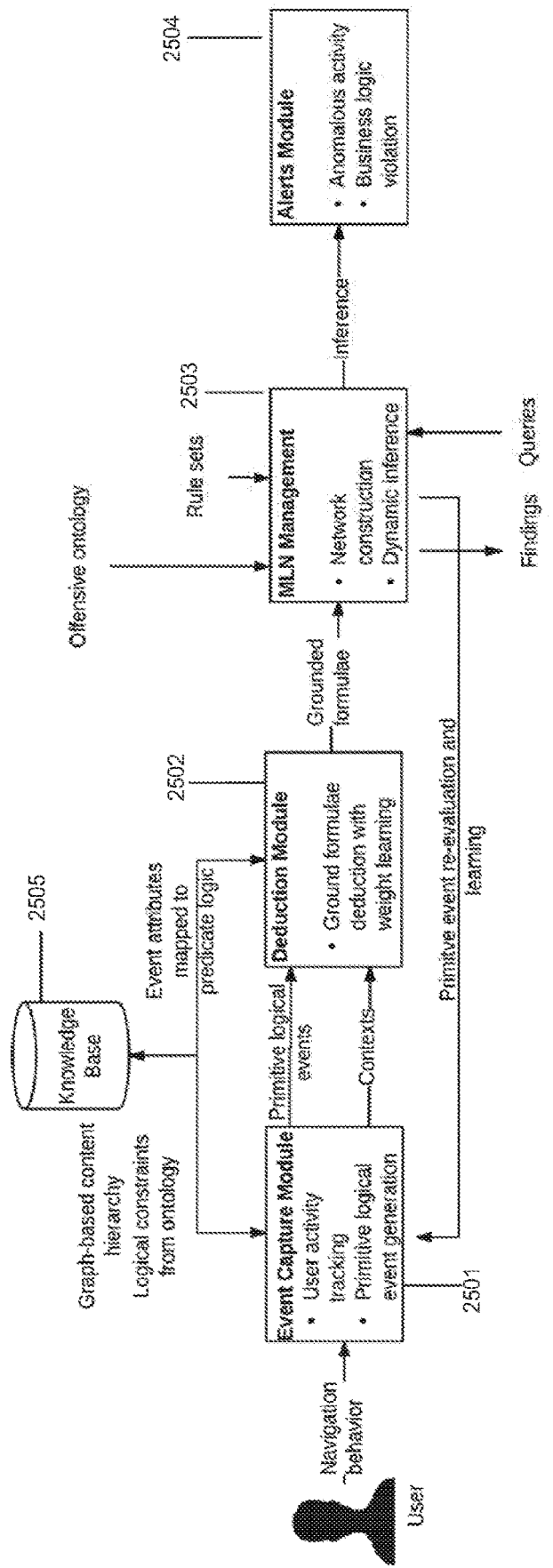
FIG. 17 is a block diagram that illustrates an overall Markov Logic Network process.

FIG. 17 illustrates the overall process flow for detecting complex business logic attacks and anomalous user activity on target web applications in real time using MLN. Successful MLN implementation allows end users to perform:
  (a) Passive attack analysis: End users can submit queries to determine the target application's susceptibility to business logic-based attacks or avail the system's capability during post-attack incident response.

(b) Active attack analysis: End users can activate the active attack enumeration mode (via Smart WAF) to detect business logic-based attacks, anomalous user activity as they occur in real time and actively block them or generate alerts.

As illustrated in the embodiment of FIG. 17, the passive and active attack analysis using MLN process preferably has three primary modules: Event Capture Module 2501, Deduction Module 2502 and MLN Management 2503 (that constructs MLN from user activity, performs dynamic inference to detect malicious user actions in real time) and Alerts Module 2504. The MLN construction happens in two modes: (a) Learning mode and (b) Live mode.

MLN construction in Learning mode is preferably part of the learning loop which includes real time interception 1004 and data capture 1002 (see FIG. 6), where it's constructed from legitimate user actions. The resultant MLN is termed Master MLN, because it is obtained from sequence of legitimate, true positive events generated from end user's navigation behavior. This is preferably also considered as part of the training mode.

In the live mode, MLN is preferably constructed in real time as the user navigates through the target web application performing different actions. This is referred to as dynamic MLN. The dynamic MLN is not necessarily a subset of the Master MLN. In an ideal implementation of an embodiment of the present invention, the Master MLN would preferably contain most of the predicate states generated in the dynamic MLN.

The Event Capture Module 2501 is preferably used to capture and process events in their primitive stage. Such events can be referred to as primitive events because they represent unprocessed behavior (for example, raw user actions). The predicate logic rules corresponding to these raw user behaviors are considered primitive logic events that are further subjected to deduction and MLN creation and management.

In learning mode, the event capture module preferably includes all steps involved in generating logical events from user navigation behavior 1002, 1004. In live mode, the event capture module preferably performs data capture in real time and derives corresponding logical events from the KB 2505.

In cases where corresponding events can't be found in the KB, they are preferably derived using the ontology derivation module. This relates back to iteratively enhancing the learning loop. However, this case likely rarely occurs because the KB is created as a comprehensive representation of user behavior (belonging to all privilege access levels) and is trained automatically whenever new logic is added to the target application.

It should be noted that all events captured and mapped to predicate logic are also preferably accompanied with corresponding event attributes i.e., constants associated with that event like user level, user identification, event name, business logic attributes etc. (available in the content and concept hierarchy). These are preferably captured and stored in the KB and are preferably an implicit part of the Event Capture Module.

The Deduction Module 2502 preferably combines primitive logic events with underlying event attributes (constants) to deduce grounded formulae. This includes applying event attributes to predicate logic formulae of the primitive events.

The result is grounded formulae for predicate logic formulae of primitive events. The set of all discrete grounded formulae obtained for all user actions are preferably used to construct the Master MLN (in learning mode) and real time MLN (in live mode).

Figure 18:
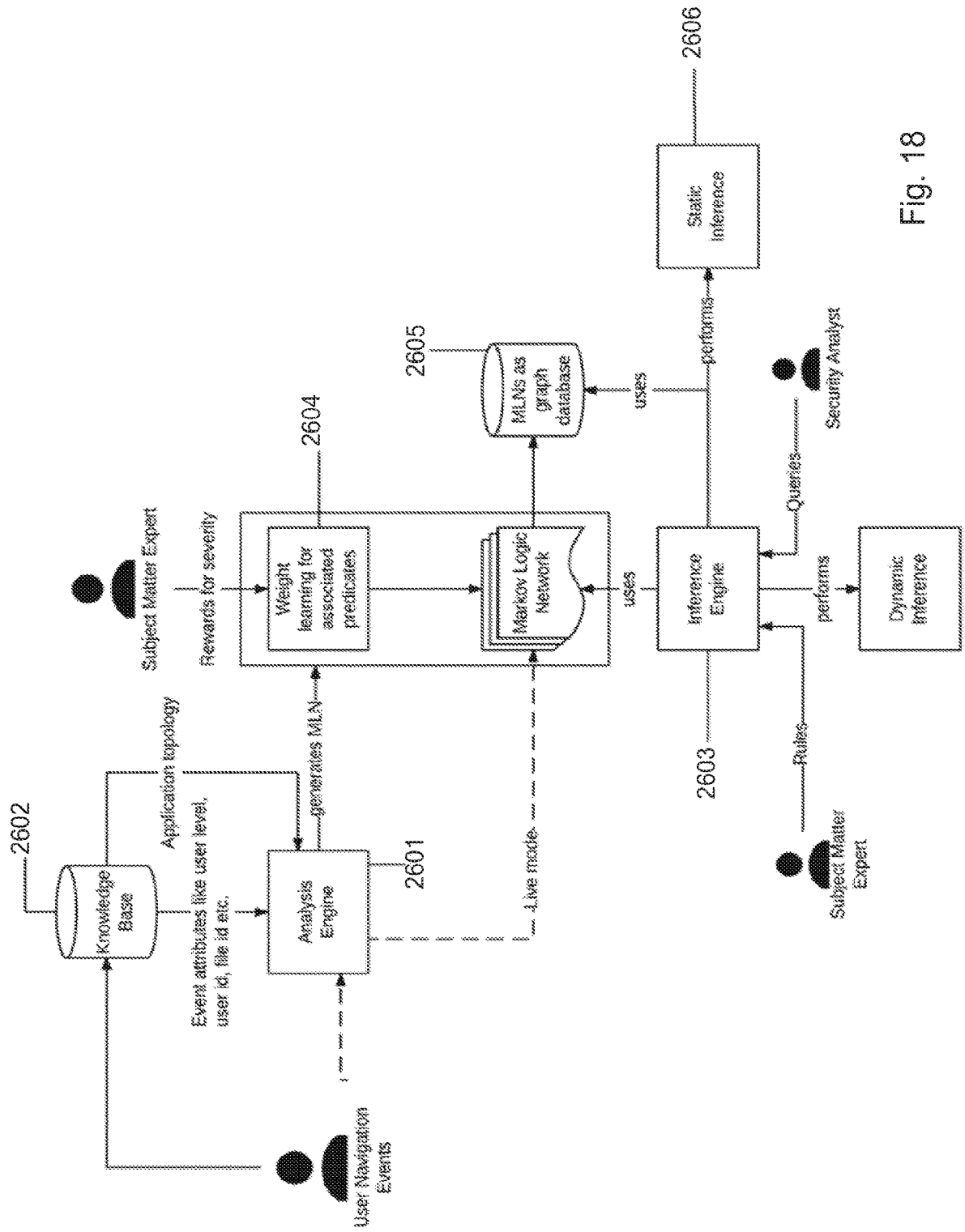
FIG. 18 is a block diagram illustrating a Markov Logic Network creation process.
Figure 20:
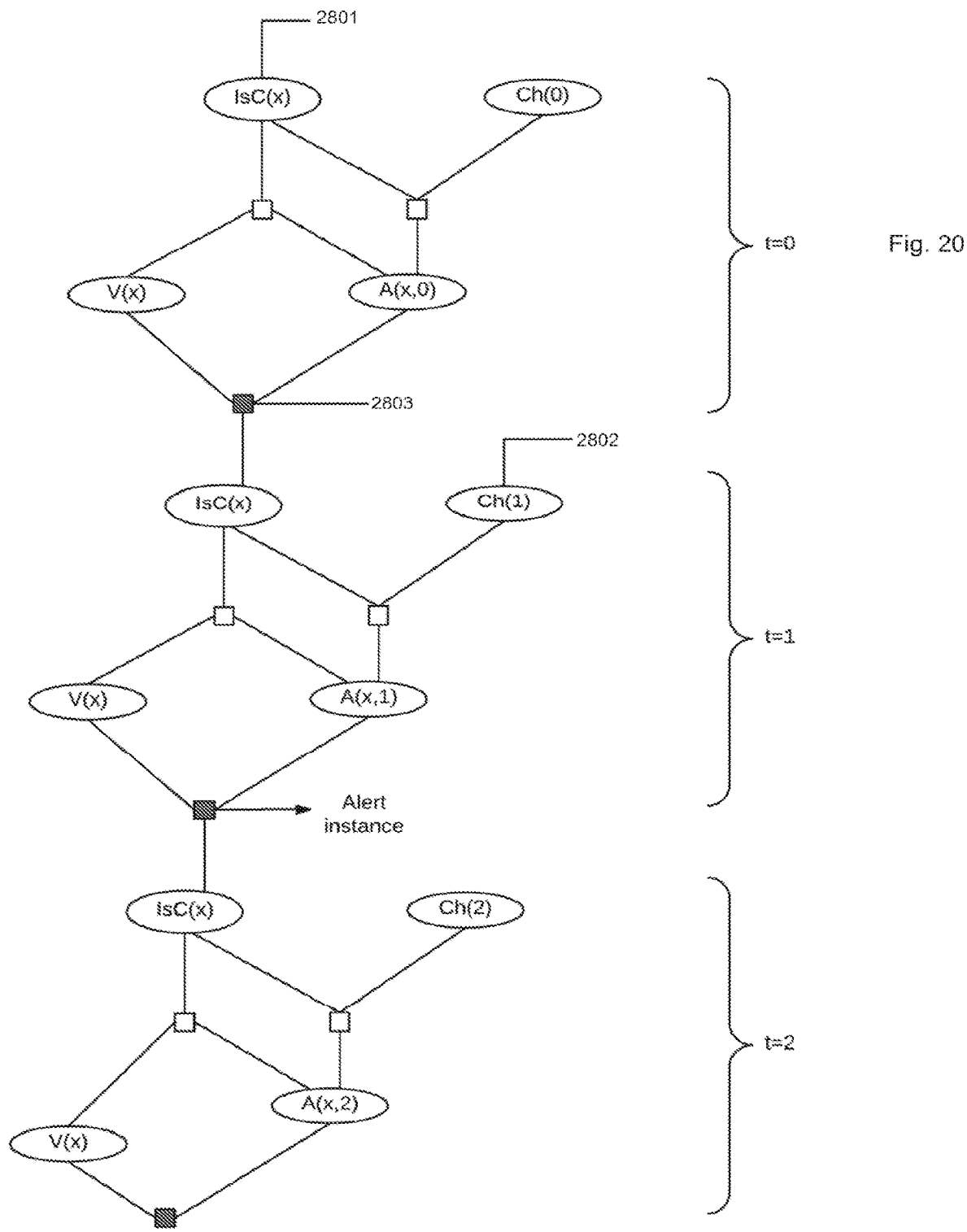
FIG. 20 is a drawing which illustrates dynamic interference using a time sliced network.

FIGS. 18 and 20 respectively explain the weight assignment methodology and dynamic inference on grounded formulae. Finally, the MLN Management Module 2503 is preferably used to construct the complete MLN using the grounded formulae. The resultant MLN is used for active and passive attack analysis through static and dynamic inference techniques. Active attack analysis can include detecting business logic attacks and anomalous user behavior in real time and generating alerts.

Passive attack analysis can include submitting queries for finding the application's susceptibility to anomalous user behavior or business logic violation based on already captured user actions.

MLN Creation

Detailed methodology for deriving the MLN from user actions is illustrated in FIG. 18. The event information extracted from users' browsing actions stored in the knowledge base is passed through an analysis engine 2601 that creates the target MLN. The analysis engine is an ILP (Inductive Logic Programming)-based engine that preferably performs two major tasks to derive the target MLN: (a) assign weights to predicate logic formulae in the knowledge base, and (b) create grounded representation of the predicate logic formulae and derive the final MLN.

Assigning Weights

In one embodiment, positive weights are assigned to each predicate logic formula based on the corresponding logical event's position (with respect to in-links and out-links) in the target web application's topology (content hierarchy) and its criticality to the application's security posture. As described above, the content hierarchy preferably captures and represents all legitimate user actions in a graphical structure. The graphical structure represents the source and destination states associated with each user action. This graphical structure is considered as application topology. The analysis engine preferably maps user generated events to the application topology and derives the source and destination states associated with each event.

The source and destination states associated with an event are also mapped to their corresponding predicate logic formulae. Thus, the analysis engine extracts the predicate logic formulae from the KB corresponding to source and destination states of user actions. The process of assigning weights 2604 to these predicate logic formulae are explained below. These source and destination states and transitions among them for each usage context and user levels are preferably used to derive weights for corresponding predicate logic formulae.

Assigning Weights to the Predicate Logic Formulae

In one embodiment, for an event e, a set of counters $c_{i,j}$ for each pair of the e's states $s_i$, $s_j \in S \times S$ and a set of counters $t_i$ for each state $s_i \in S$ are initially defined. The analysis engine increments both the counter $c_{i,j}$ for each transition from state $s_i$ to $s_j$ and the counter $t_i$ for each transition whose source state is $s_i$, independent of its destination state. The counter $t_i$ represents the number of times the user exited state $s_i$, while the counter $c_{i,j}$ represents the user moved from state $s_i$ to $s_j$. The analysis engine updates the counters for each legitimate user action that corresponds to a transition in the model, and uses these counters to compute the (i, j) entry of the stochastic matrix P that represents the probability of traversing the edge from state $s_i$ to state $s_j$, by computing the following frequency $$P(s_i, s_j) = \frac{c_{i,j}}{t_i}$$

for all pairs of states $s_i$ and $s_j$. The probability $P(s_i, s_j)$ is preferably computed as the ratio between the number of traversals of the transitions from state $s_i$ to $s_j$ and the total number of traversals of the transitions exiting state $s_j$, and corresponds to the maximum likelihood estimator for $P(s_i, s_j)$. The analysis engine also takes rewards as inputs from SMEs (Subject Matter Experts) that are used in combination with $P(s_i, s_j)$ to derive weight for each predicate logic formula. Based on the criticality and sensitivity of the data (constants) associated with each event (and corresponding predicate logic formula), rewards are assigned to it. The higher the criticality of the constants belonging to the event, the greater in value the reward is. Finally, for a given event e, $P(s_i, s_j)$ is combined with any reward ($r_e$) to derive its positive weight ($w_e$). We represents the confidence in the first order logic statements in this context. As a simple example, in an authentication page, the predicate statement corresponding to the login action holds higher weight than the predicate statement for the 'forgot password' action on the same page.

In one embodiment, the user privilege access level preferably plays a key role in assigning weights to predicate statements. Weights assigned to the same predicate logic representation of an event can vary based on which user access level can perform what actions using that event in the target application's context.

Deriving Grounded Formulae

After each predicate logic formula is assigned weights based on the underlying context and user privilege access level, in one embodiment, the predicate logic formula is preferably converted to its grounded representation. Grounding preferably corresponds to replacing the variables in the predicate logic formula with constants. In one embodiment, generic variables in predicate logic formulae are replaced with corresponding contextual constants like username, user id, user privilege access level, unique identifiers (like nonce, session keys) etc. for different events generated from user actions. Remember, these are preferably already available in the KB via content and concept hierarchy.

The discrete union of all grounded predicate logic formulae along with their weights are preferably used to create the master MLN (in the learning mode). Formally, the MLN can be defined as follows: Given a finite set of constants, MLN is preferably initiated as a Markov Random Field ("MRF") 2605 in which each node is a grounding of a predicate (atom) and each feature is a grounding of one of the formulas (clauses). This leads to the following joint probability distribution for all atoms:

$$P(X = x) = \frac{1}{Z} \exp\left(\sum_i w_i n_i(x)\right)$$

where $n_i$ is the number of times the $i^{th}$ formula is satisfied by the state of the world x and Z is a normalization constant, required to make the probabilities of all worlds to sum to one. The probability distribution gives the probability of an entire state of an MLN. For example, "what is the probability that entire network configuration will be X?". This property is taken advantage of over a time series representation of MLN in the inference model.

Representing MLN as Time Series Sequence Using the Sliced Network Model.

The Master MLN (constructed during the learning mode) and the dynamic MLN (constructed during the live mode) are sliced network models indexed over time. The sliced network model is created based on the fact that users interact with web applications in a sequential manner (over time) by executing one event after another based on their desired functionality.

Figure 19:
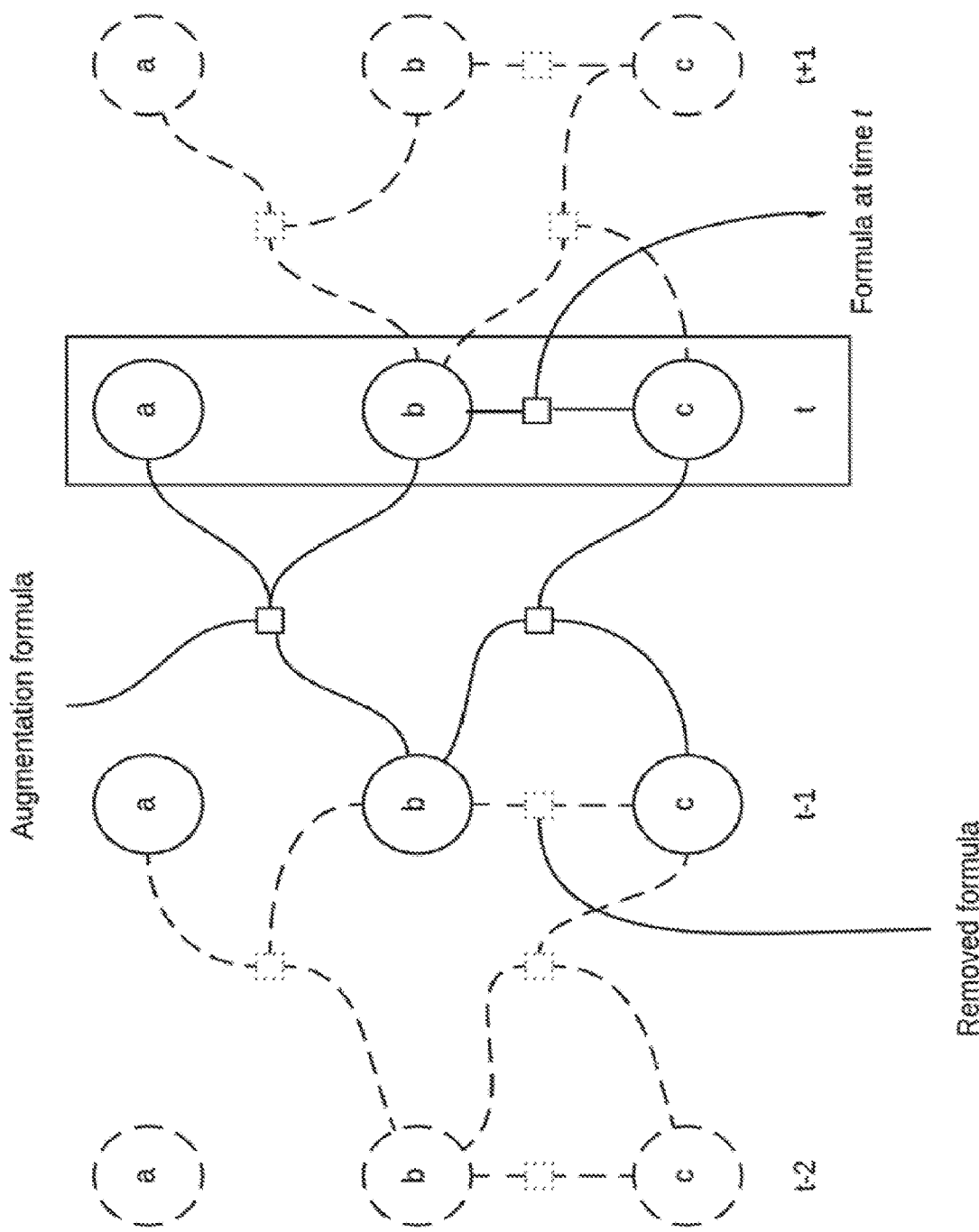
FIG. 19 is a drawing which illustrates a dynamic Markov Logic Network using a sliced Markov Network model.

Both the Master MLN (£) and dynamic MLN (L) are preferably constructed as follows: Introduce a time sort T, consisting of positive integers, over which subsections of L are indexed. The time sort T preferably contains values t designated as individual points in time. If the predicates in L are dependent on t, then L is said to be a Dynamic Markov Logic Network (DMLN). If every predicate in L is time-dependent, then L is preferably said to be a "pure" DMLN (see FIG. 19).

$$f = f(t, \ldots) \forall (f, w) \in L, t \in T \Rightarrow \text{Pure dynamic } MLN$$

In one embodiment, a slice network denoted by L[t], is a DLMN for which the time sort has only the values $C_T=\{t-1, t\}$ and all formulae which contain atoms at time step t are fixed to that time step. Thus, L[t] includes the following
  a. Ground atoms of time steps t−1, t
  b. All formulae connecting atoms in time t
  C. Summary formulae transferring information from t−1

In other words, L is preferably divided into a set of sub-networks and indexed over the time sort T. Each of these sub-networks is a slice network L[t]. Each slice network preferably ranges over two time steps and is constructed using the output of the previous slice. The union operation of all these slice networks produces the entire dynamic MLN.

Summary factors (denoted f) are formulae in the factor graph of L, which summarize the information coming into a node v originating from removed factors during the instantiation at time t−1. Particularly, the information of interest is the joint probability of each v. This can be approximated by using the product of the marginal probabilities of each v (its value during time t−1). Thus, a summary factor $f_v$ is created that sends as a constant message to v the marginal distribution of v during t−1 Thereby capturing the fixed messages from time t−1 to be used in L[t]. (In one embodiment, it is important that these messages be constants, because then inference can be performed on L[t] as though it were a single static network.)

For this MLN model, we are interested in formulae in the form of logical predicates, which only take on a binary value. i.e. $f_v \in \{0, 1\}$. By computing a summary factor, the associated formula itself does not change. Instead, the weight of the formula is recalculated to adjust for how much that formula "matters" in time t. This weight serves as the message to be pushed by the associated formula to the nodes it connects. The marginal probability of $f_v$ is considered under the set of nodes in which v is a member of a maximal clique, for each v in $f_v$.

The process of adding summary factors to a slice network is called augmentation. In one embodiment, the sequence of augmented slice networks is created as follows:

Let V be a set of ground atoms in L, and let p: V→[0,1] be a map which returns the marginal probability of a ground atom f. The augmented slice network is defined as:

$$L\uparrow(V, p) := L \cup \left\{\left(f, \ln\frac{p(f)}{1 - p(f)}\right) : f \in V\right\}$$

Based on the above, the sequence of augmented slice networks is as following:

$$L_0 := L[0]$$
$$L_i = L[i] \uparrow (V_{i-1}, p_{i-1})$$

where $V_{i-1}$ is the set of ground atoms of time i−1 and $p_{i-1}(v)$ returns the marginal probability of v at that time.

The result is that the summary factor $f_v$ emits a message of $p_{i-1}^{(v)}$ to a node $v \in L_t$ (instantiated during t−1) to capture and "freeze" past information to be used in $L_t$. Note that taking the union of the entire sequence of slice networks approximates the original network:

$$\bigcup_i L_i \approx L$$

The summary factor $f_v$ that is preferably calculated at each time transition is used to predict anomalous user behavior. Particularly, the analysis engine applies relative entropy measures on $f_v$ for predictions.

Inference Engine

The inference engine 2603 preferably performs static and dynamic inference on the MLN. Static inference 2606 preferably pertains to the functionality that allows security analysts to submit queries asking the susceptibility of the web application to complex business logic attacks, given a sequence of user actions on target web application. The queries submitted can, for example, be, "Can a user with userid=$U_i$ escalate his privilege access level?" When this query is submitted to the analysis engine, static inference is preferably performed on $U_i$'s actions captured using dynamic MLN (L). The static inference on the sliced network can include calculating P (X=x) where x is the event that represents $U_i$ escalating his privilege access level through potential malicious action. This can include the following two steps:
 a) Return the minimal subset of L, required to compute the query involving the formula F.
 b) Perform inference on that minimal subset using either MC-SAT or belief propagation method (whichever is applicable).

Dynamic Inference

Dynamic inference pertains to subjecting the dynamic MLN (L) through stochastic probabilistic analysis for detecting user behavior anomalies (in terms of privilege escalation attacks, business logic exploiting attacks etc.) in real time. SMEs can optionally specify rules to the inference engine representing the anomalous behavior they want to detect and stop. Even without such rules, embodiments of the present invention can still detect anomalous user behavior based on MLN comparison techniques.

The concept of relative entropy is preferably implemented on the master MLN (L) and dynamic MLN (L) to detect deviations in user behavior and infer potential attacks in progress. The goal is to determine if end users perform an illegitimate action i.e., if a node-factor structure (branch) is created in L which is not found in L.

The relative entropy (also known as KL-divergence) is a metric that returns the distance between two probability distributions. The returned value is a real number demonstrating how similar the two distributions are: lower values indicate more similarity. The concept is primarily adapted to MLNs, because MLNs represent a grounded form of user actions.

Let P (X, Y) and Q (X, Y) be joint probability distributions of discrete random variables $X \in X$ and $Y \in Y$. The conditional relative entropy between conditional probability distributions P(Y|X) and Q(Y|X) is given by:

$$D(P(Y|X)\|Q(Y|X)) := \sum_{x \in X} P(x) \sum_{y \in Y} P(y|x) \ln \frac{P(y|x)}{Q(y|x)}$$

In one embodiment, for a given time t, the relative entropy is preferably computed between the joint probability distributions of L and $L_{t*1}$ during the dynamic inference and compared with a tolerance level $\varepsilon > 0$. If the relative entropy is greater than $\varepsilon$, an attack is detected, and alert is generated. The tolerance level $\varepsilon$ for different logical events is preferably derived based on heuristics applied on P (si, sj) transitions. Because L is the master MLN, each slice $L_t$ will likely contain more nodes and branches than $L_t$ does. To account for this, in addition to computing the relative entropy itself, all valid actions are preferably removed from L and a check is performed to see if there are any nodes or branches left over. If yes, an alert is preferably generated for that action.

$$(D(P_{L,t}\|P_{\mathcal{L},t}) > \varepsilon) \wedge (L_t - (L_t \cap \mathcal{L}_t) \neq \emptyset) \Rightarrow \text{Alert}$$

Detecting Complex Business Logic Attacks in Real Time Using Dynamic Inference

In one embodiment, relative entropy applied on L and L is preferably used to detect changing values of parameters (constants in L and L) in real time and deviated paths to predict attacks like business logic attacks, privilege escalation attacks etc. Common undetected attack methodologies implemented while performing complex business logic attacks include (a) assigning syntactically correct values to application parameters that exploit the underlying business logic (b) exploring paths in the application topology that are not intended for the current privilege access level of the end user. As L is created while the end user is performing his actions on the target application, a node v is added to the current slice network $L_t$. Before creating $L_{t+1}$, embodiments of the present invention preferably validate the event (resulting from user's actions) movement to v. This is preferably performed by identifying the probability distribution of $L_t$ with the presence of v. To compare this slice network to the corresponding (presumably pre-computed during the learning mode) slice of the master MLN $L_t$, the presence of a node or branch is checked for in $L_t$ that is not in $L_t$ i.e., $$L_t - (L_t \cap L_t) = \{v\} \neq \emptyset|$$

When a deviation is detected in the network, the relative entropy is preferably computed between L and L as follows:

$$D(P_L(X|E)\|P_\mathcal{L}(X|E)) \sum_{e \in \varepsilon} P_L(e) \sum_{x \in X} P_L(x|e) \ln \frac{P_L(x|e)}{P_\mathcal{L}(x|e)}|$$

The dynamic inference applied to the coupon scenario is illustrated in FIG. 20. It represents L. Reference number 2801 represents grounded predicate logic formulae in time sorted format derived from user actions performed during time instance t=0. This is the sliced MLN created at time instance t=0. Similarly, reference number 2802 represents grounded predicate logic formulae for user actions during time instance t=i. Summary factor node 2803 propagates the constants carried over from user actions performed at time instance t=0 to t=1. Before proceeding to create the sliced network at time instance t=1, the summary factor node is preferably subjected to an offensive ontology-based rules set that checks for changes in constants. Remember that the summary factor is preferably a grounded representation of the predicate logic that has all related constants as illustrated in FIG. 18. Changes in these constants reveal attack attempts using syntactically valid payloads and real-time alert is preferably generated. To enumerate deviation in user's behavior from intended path, the relative entropy is computed (between L and L) at each summary factor node and the resulting value is compared with the pre-defined acceptable threshold ε. If the value is above ε, then an alert for privilege escalation or deviation in intended business logic is generated.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus can also include a plurality of such computers/distributed systems (e.g., connected over the Internet and/or one or more intranets) in a variety of hardware implementations. For example, data processing can be performed by an appropriately programmed microprocessor, computing Gloud, Application Specific Integrated Circuit (ASIC), or the like, in conjunction with appropriate memory, network, and bus elements. One or more processors and/or microcontrollers can operate via instructions of the computer code and the software is preferably stored on one or more tangible non-transitive memory-storage devices.

Embodiments of the present invention help computer programmers as well as those who host computer software by providing a mechanism to evaluate software products for vulnerabilities and by monitoring and actively preventing complex attacks thereon—particularly for web-based applications. An embodiment of the present invention is necessarily rooted in computer technology in order to overcome a problem specifically arising in the realm of computers. Embodiments of the present invention achieve important benefits over the current state of the art, by providing a technology-based solution that overcomes existing problems thereof in a technical way to satisfy an existing problem—namely the ability to quantify the likelihood of an attack on software: detecting and preventing complex attacks; and testing software for vulnerabilities to sophisticated attacks, thus greatly enhancing the security of such computer programs.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and and/or reconfiguration of their relationships with one another.

What is claimed is:

1. A method for providing intelligent web application security, the method comprising:
capturing requests and response sequences within a target application, wherein:
the requests and response sequences include synchronous HTTP request and asynchronous HTTP requests and response sequences;
the requests and response sequences result from user actions in real time;
the synchronous HTTP requests and response sequences include traditional GET and POST HTTP requests between a client and a server;
creating a structured content hierarchy based on captured unstructured HTTP(S) data;
creating a concept hierarchy from the structured content hierarchy, the concept hierarchy representing a "is-a" relationship of content of the target application;
generating an ontology of the target application from the concept hierarchy and storing the ontology in a knowledge base, the ontology being represented using first order predicate logic that represents domain knowledge of the target application;
creating a master Markov logic network (MLN) and a dynamic MLN based on the captured synchronous and asynchronous HTTP requests of the knowledge base; and
predicting an attack on the target application using the master MLN and the dynamic MLN, wherein the predicting an attack on the target application is based on determining a relative entropy of the master MLN and dynamic MLN to detect deviations in user behavior and infer potential attacks in progress.

2. The method of claim 1, wherein:
the first order predicate logic includes multiple predicate logic formulae; and
the creating the master MLN includes:
assigning weights to the predicate logic formulae in the knowledge base; and
deriving grounded representations of the predicate logic formulae in which variables in the predicate logic formulae are replaced by constants.

3. The method of claim 2, wherein:
the predicate logic formulae includes a first predicate logic formula;
the first predicate logic formula corresponds to a first event;
a first event includes a source state and a destination state; and
a first weight of the weights assigned to the first predicate logic formula is based on a first constant associated with the first event, a reward assigned to the first event based at least partially on the first constant, and a probability of a number of transitions between the source state to the destination state to a number of transitions from the source state to any destination state.

4. The method of claim 3, wherein:
the structured content hierarchy captures and represents the user actions in a graphical structure that represents source and destination states associated with each event of the user actions; and
the weights are assigned to each of the predicate logic formulae based on a position of a corresponding logical event in the structured content hierarchy.

5. The method of claim 4, wherein:
the capturing the requests and response sequences partially occurs during a training mode in which logical events are generated from navigation behavior of the target application; and
the master MLN is based on the logical events generated during the training mode.

6. The method of claim 5, wherein:
the capturing the requests and response sequences occurs during a live mode in which additional logical events are derived from the knowledge base; and
the dynamic MLN is based on the additional logical events derived during the live mode.

7. The method of claim 6, wherein the logical events and the additional logical events are mapped to the first order predicate logic of the ontology.

8. The method of claim 7, wherein:
event attributes are associated with the logical events and the additional logical events; and
the event attributes include constants associated with a user level of a user performing the user actions, user identification of a user performing the user actions, or an event name.

9. The method of claim 8, wherein the event attributes are combined with the logical events and the additional logical events to deduce the grounded representations of the predicate logic formulae.

10. The method of claim 1, further comprising performing stochastic probabilistic analysis of the dynamic MLN to detect user behavior anomalies in real time.

11. A non-transitory computer-readable medium having encoded therein programming code executable by one or more processors to perform or control performance of operations for providing intelligent web application security, the operations comprising:
capturing requests and response sequences within a target application, wherein:
the requests and response sequences include synchronous HTTP request and asynchronous HTTP requests and response sequences;
the requests and response sequences result from user actions in real time;
the synchronous HTTP requests and response sequences include traditional GET and POST HTTP requests between a client and a server;
creating a structured content hierarchy based on captured unstructured HTTP(S) data;
creating a concept hierarchy from the structured content hierarchy, the concept hierarchy representing a "is-a" relationship of content of the target application;
generating an ontology of the target application from the concept hierarchy and storing the ontology in a knowledge base, the ontology being represented using first order predicate logic that represents domain knowledge of the target application;
creating a master Markov logic network (MLN) and a dynamic MLN based on the captured synchronous and asynchronous HTTP requests of the knowledge base; and
predicting an attack on the target application using the master MLN and the dynamic MLN, wherein the predicting an attack on the target application is based on determining a relative entropy of the master MLN and dynamic MLN to detect deviations in user behavior and infer potential attacks in progress.

12. The non-transitory computer-readable medium of claim 11, wherein:
the first order predicate logic includes multiple predicate logic formulae; and
the creating the master MLN includes:
assigning weights to the predicate logic formulae in the knowledge base; and
deriving grounded representations of the predicate logic formulae in which variables in the predicate logic formulae are replaced by constants.

13. The non-transitory computer-readable medium of claim 12, wherein:
the predicate logic formulae includes a first predicate logic formula;
the first predicate logic formula corresponds to a first event;
a first event includes a source state and a destination state; and
a first weight of the weights assigned to the first predicate logic formula is based on a first constant associated with the first event, a reward assigned to the first event based at least partially on the first constant, and a probability of a number of transitions between the source state to the destination state to a number of transitions from the source state to any destination state.

14. The non-transitory computer-readable medium of claim 13, wherein:
the structured content hierarchy captures and represents the user actions in a graphical structure that represents source and destination states associated with each event of the user actions; and
the weights are assigned to each of the predicate logic formulae based on a position of a corresponding logical event in the structured content hierarchy.

15. The non-transitory computer-readable medium of claim 14, wherein:
the capturing the requests and response sequences partially occurs during a training mode in which logical events are generated from navigation behavior of the target application; and
the master MLN is based on the logical events generated during the training mode.

16. The non-transitory computer-readable medium of claim 15, wherein:
the capturing the requests and response sequences occurs during a live mode in which additional logical events are derived from the knowledge base; and
the dynamic MLN is based on the additional logical events derived during the live mode.

17. The non-transitory computer-readable medium of claim 16, wherein the logical events and the additional logical events are mapped to the first order predicate logic of the ontology.

18. The non-transitory computer-readable medium of claim 17, wherein:

event attributes are associated with the logical events and the additional logical events; and the event attributes include constants associated with a user level of a user performing the user actions, user identification of a user performing the user actions, or an event name.

19. The non-transitory computer-readable medium of claim 18, wherein the event attributes are combined with the logical events and the additional logical events to deduce the grounded representations of the predicate logic formulae.

20. The non-transitory computer-readable medium of claim 11, wherein the operations further comprise performing stochastic probabilistic analysis of the dynamic MLN to detect user behavior anomalies in real time.

* * * * *